(12) United States Patent
Elgrissy

(10) Patent No.: US 9,826,079 B2
(45) Date of Patent: Nov. 21, 2017

(54) MULTIFUNCTION PERIPHERAL DEVICE WITH INTERCHANGEABLE CONNECTORS AND CASTS FOR MOBILE DEVICES

(71) Applicant: Aharon Henry Elgrissy, Los Angeles, CA (US)

(72) Inventor: Aharon Henry Elgrissy, Los Angeles, CA (US)

(*) Notice: Subject to any disclaimer, the term of this patent is extended or adjusted under 35 U.S.C. 154(b) by 0 days.

(21) Appl. No.: 14/938,505

(22) Filed: Nov. 11, 2015

(65) Prior Publication Data
US 2016/0286025 A1  Sep. 29, 2016

Related U.S. Application Data

(63) Continuation-in-part of application No. 29/514,035, filed on Mar. 26, 2015.

(51) Int. Cl.
| H04M 1/00 | (2006.01) |
|---|---|
| H04M 1/725 | (2006.01) |
| H04B 1/3888 | (2015.01) |
| H04W 4/00 | (2009.01) |
| H04M 1/02 | (2006.01) |

(52) U.S. Cl.
CPC ...... *H04M 1/72527* (2013.01); *H04B 1/3888* (2013.01); *H04M 1/0262* (2013.01); *H04M 1/0274* (2013.01); *H04M 1/72575* (2013.01); *H04M 2250/14* (2013.01); *H04W 4/008* (2013.01)

(58) Field of Classification Search
CPC ....... H04W 4/008; H04W 4/02; H04W 12/06; H04W 88/02; H04W 52/0261; H04W 52/04

USPC .... 455/41.1, 41.2, 41.3, 522, 523, 572, 573, 455/90.1, 90.3, 575.8, 344, 347, 556.1
See application file for complete search history.

(56) References Cited

U.S. PATENT DOCUMENTS

| | | | |
|---|---|---|---|
| 2008/0220752 A1* | 9/2008 | Forstall | H04M 1/56 455/415 |
| 2008/0224659 A1* | 9/2008 | Singh | H04M 1/0258 320/114 |
| 2009/0130874 A1* | 5/2009 | Englund | H01R 13/645 439/131 |
| 2011/0208545 A1* | 8/2011 | Kuester | G06Q 40/08 705/4 |
| 2012/0043236 A1* | 2/2012 | Szucs | A45C 11/00 206/320 |
| 2012/0275025 A1* | 11/2012 | Parrill | G02B 23/16 359/511 |
| 2013/0270002 A1* | 10/2013 | Fawcett | H01R 11/01 174/84 S |
| 2014/0304529 A1* | 10/2014 | Meazell | G06F 1/266 713/300 |
| 2015/0084769 A1* | 3/2015 | Messier | H04W 4/021 340/539.13 |
| 2015/0350147 A1* | 12/2015 | Shepherd | H04L 51/24 715/752 |

(Continued)

*Primary Examiner* — Jean Gelin
(74) *Attorney, Agent, or Firm* — Thomas W. Galvani, P.C.; Thomas W. Galvani

(57) ABSTRACT

Disclosed herein is a multifunction core for use with a wide variety of belt connectors, operating systems, mobile devices, and replaceable cases. The features of the multifunction core are controlled by a dedicated application program installed in the mobile device.

15 Claims, 30 Drawing Sheets

(56) References Cited

U.S. PATENT DOCUMENTS

2016/0041830 A1* 2/2016 Borve .................. G06F 9/4411
   710/8
2016/0192124 A1* 6/2016 Matsuda ............... H04W 4/008
   455/41.1
2016/0330327 A1* 11/2016 Lee ....................... H04L 12/12

* cited by examiner

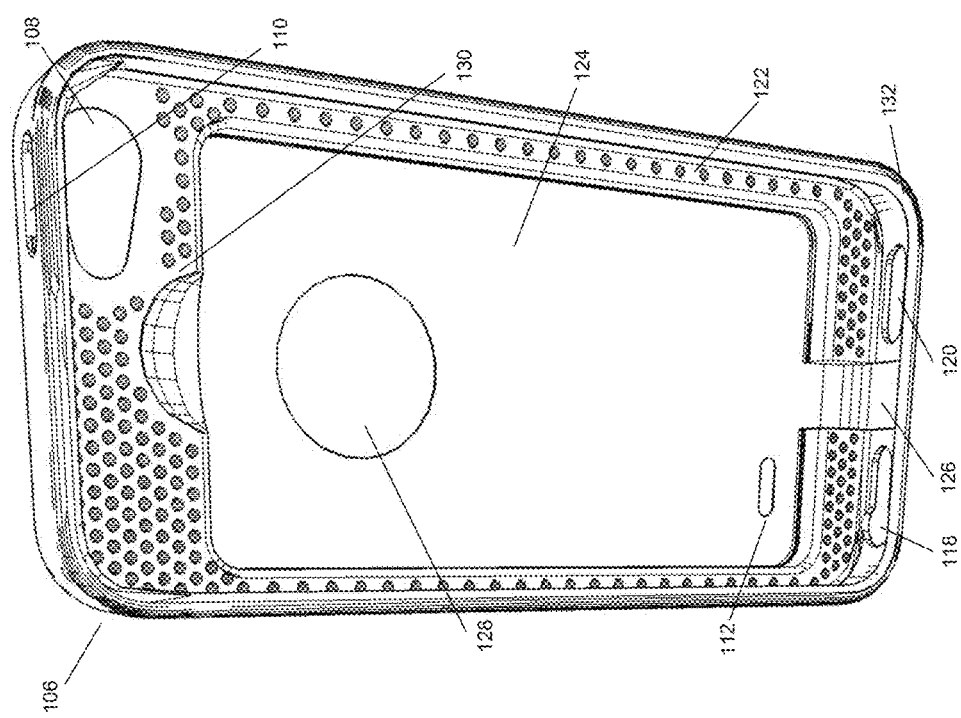
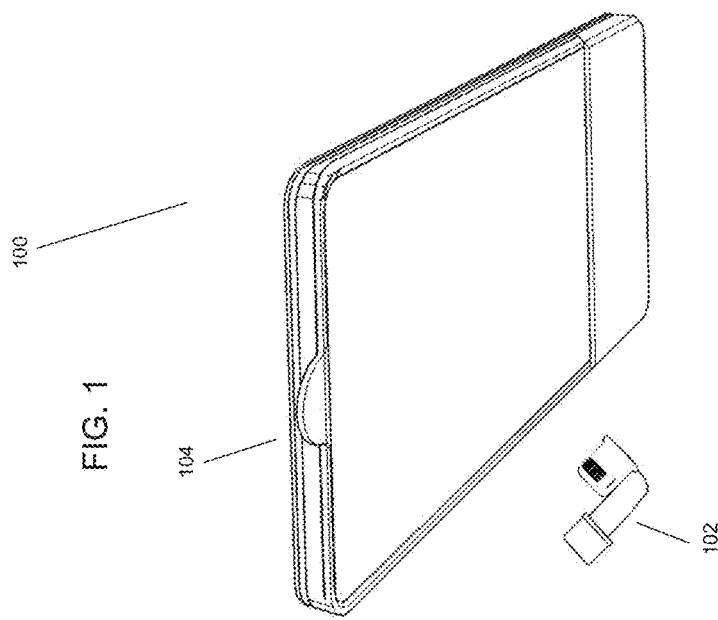
FIG. 1

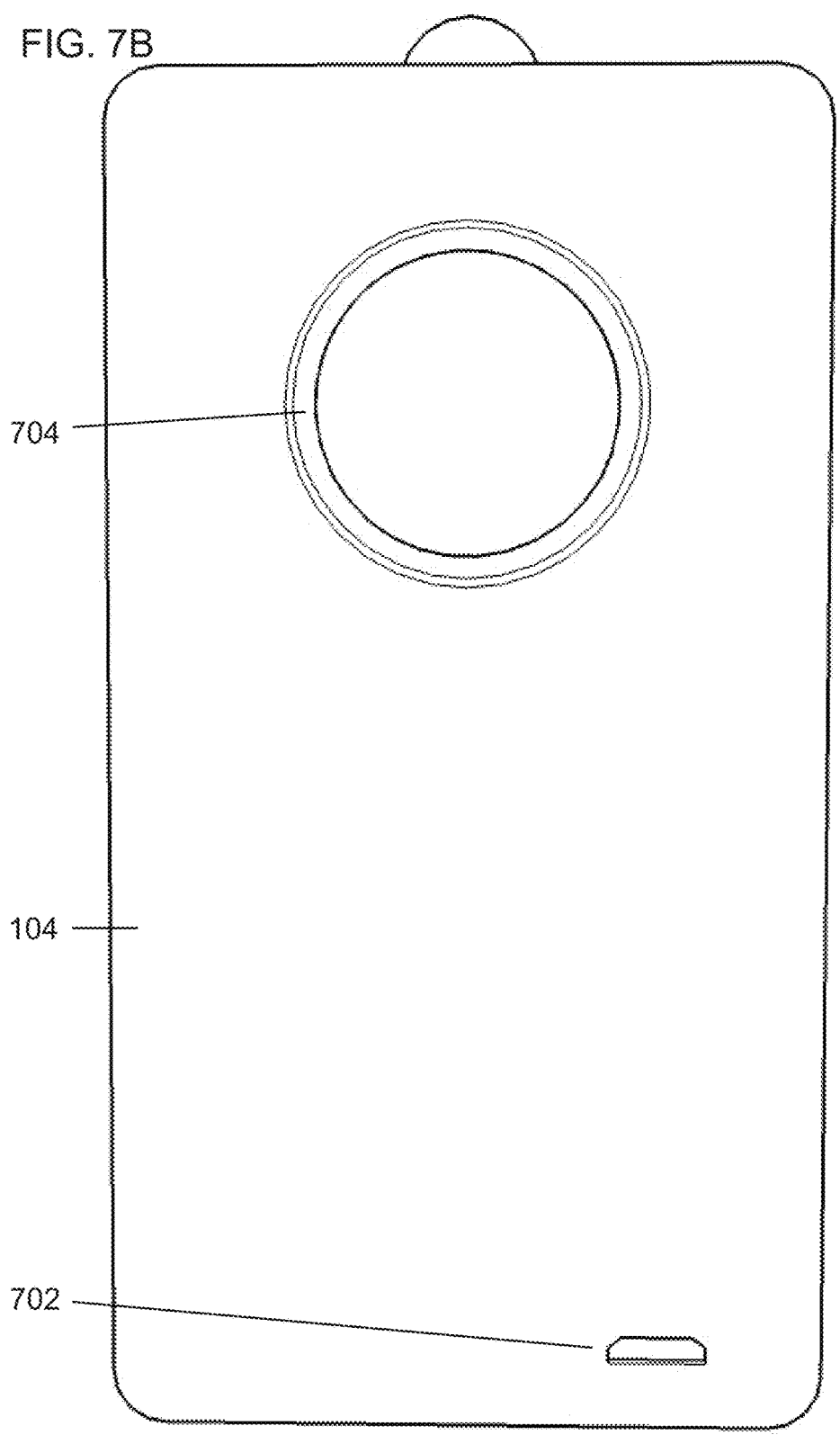

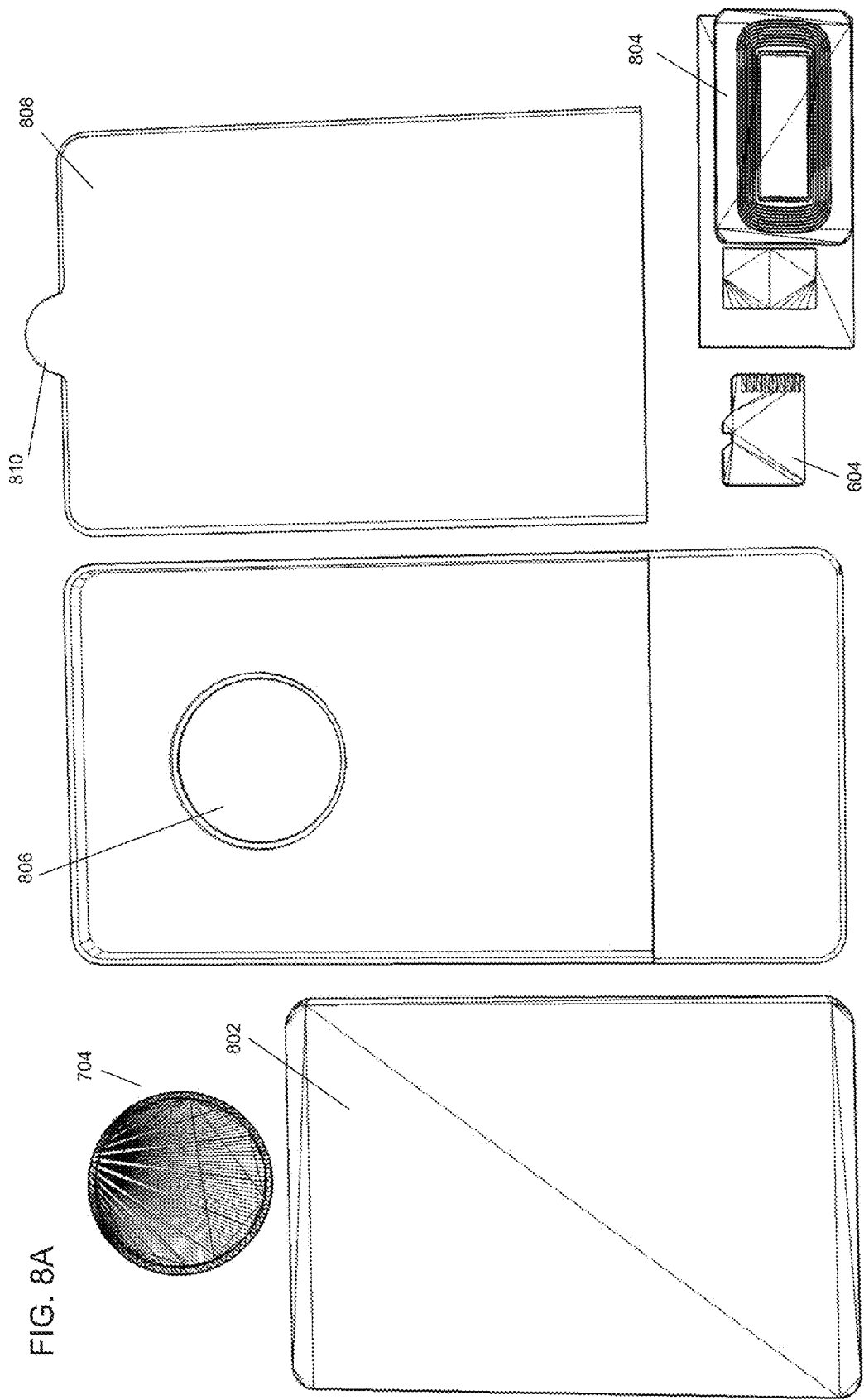

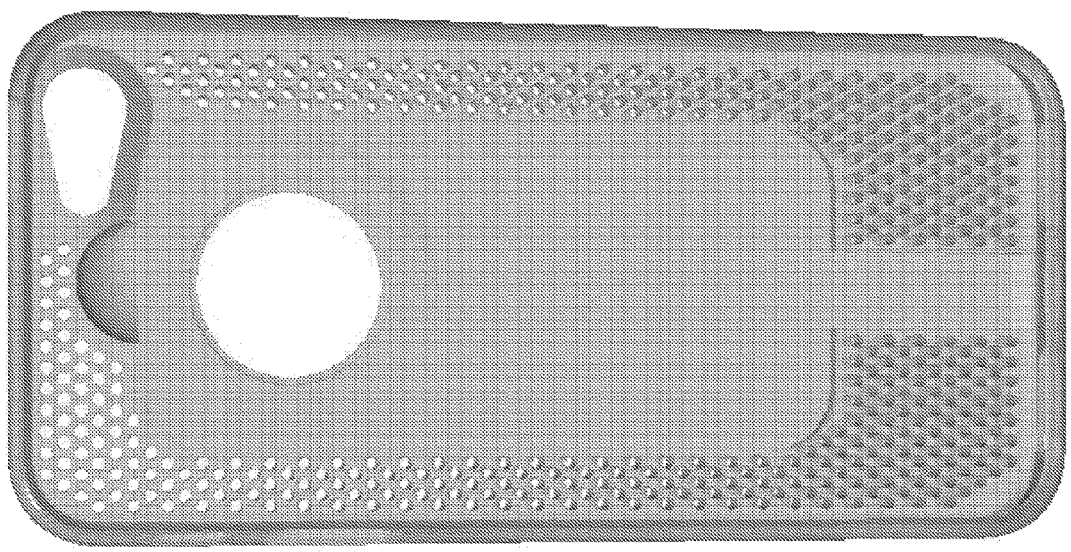
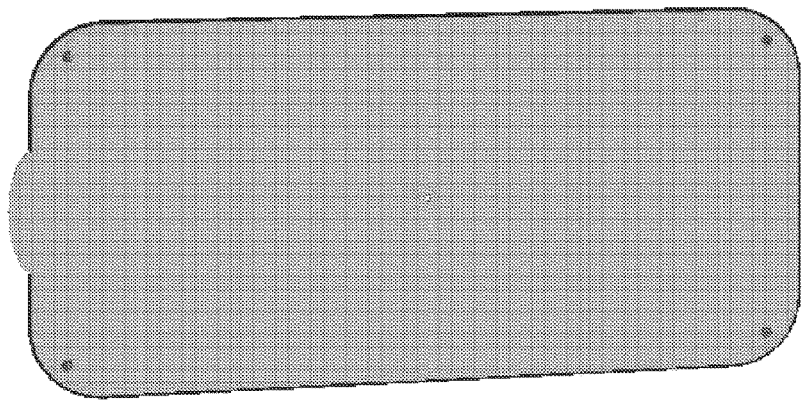
FIG. 15C

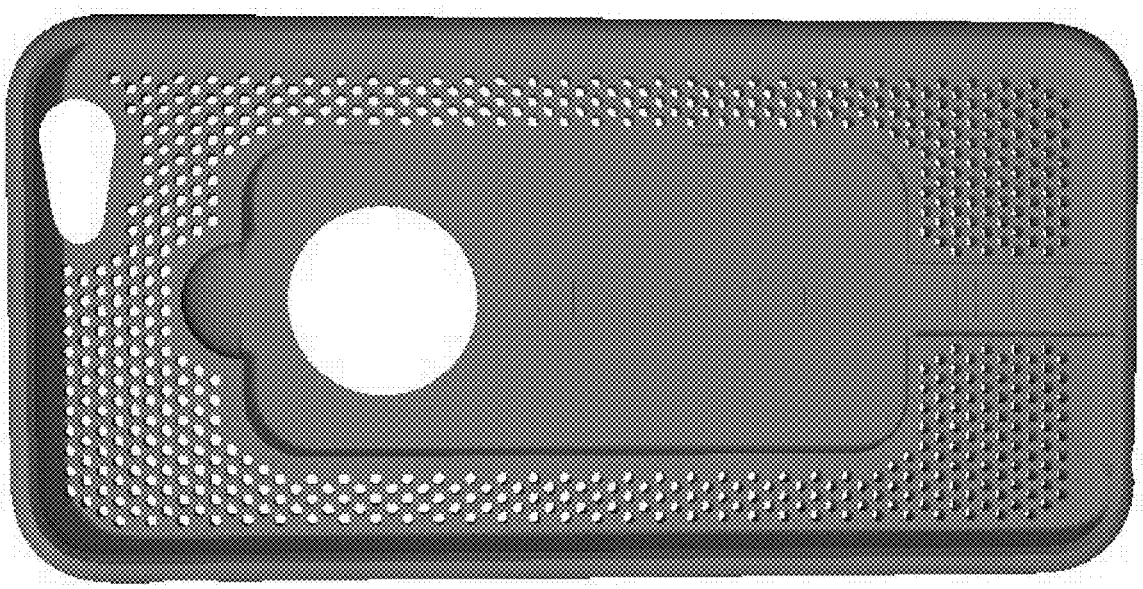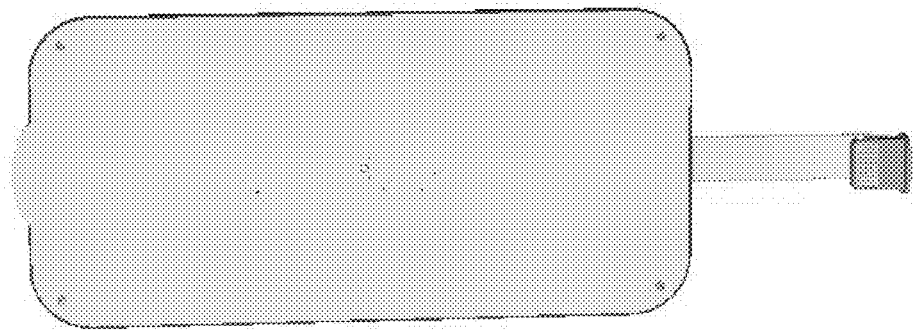
FIG. 15E

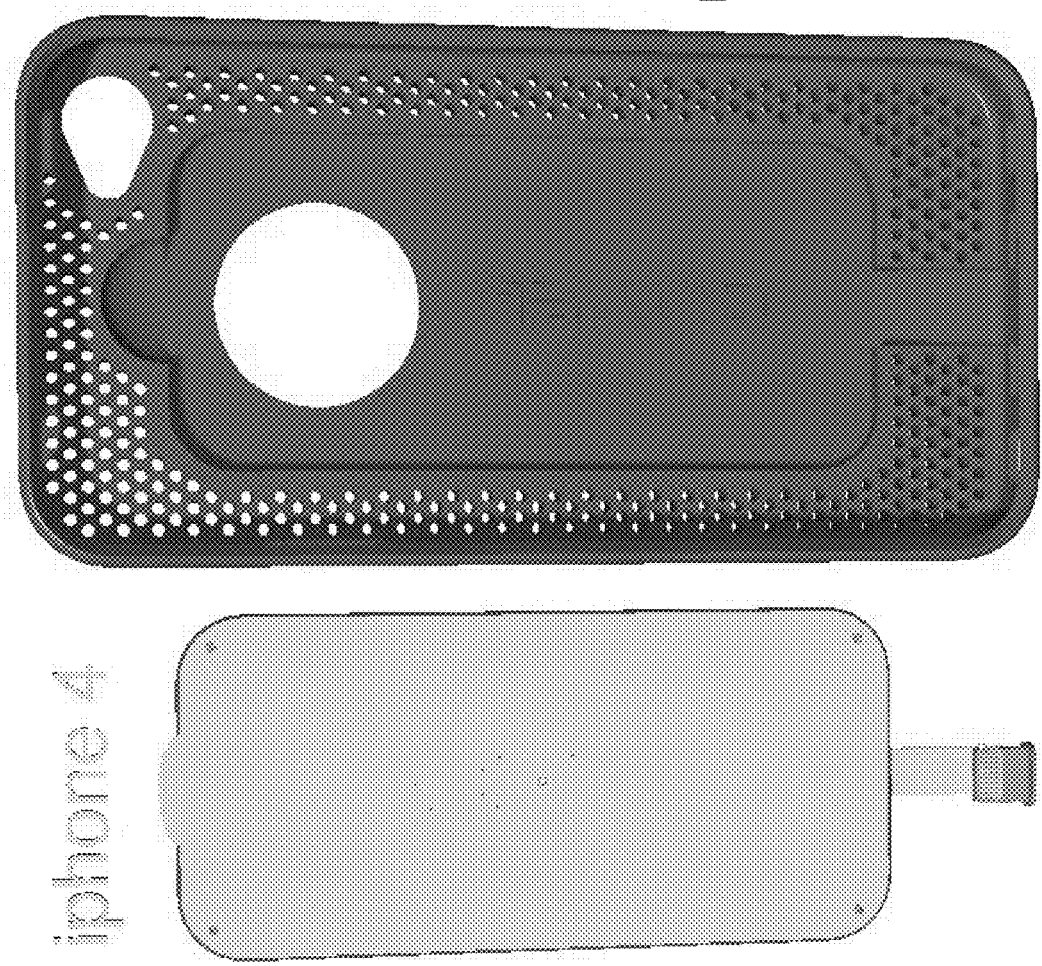

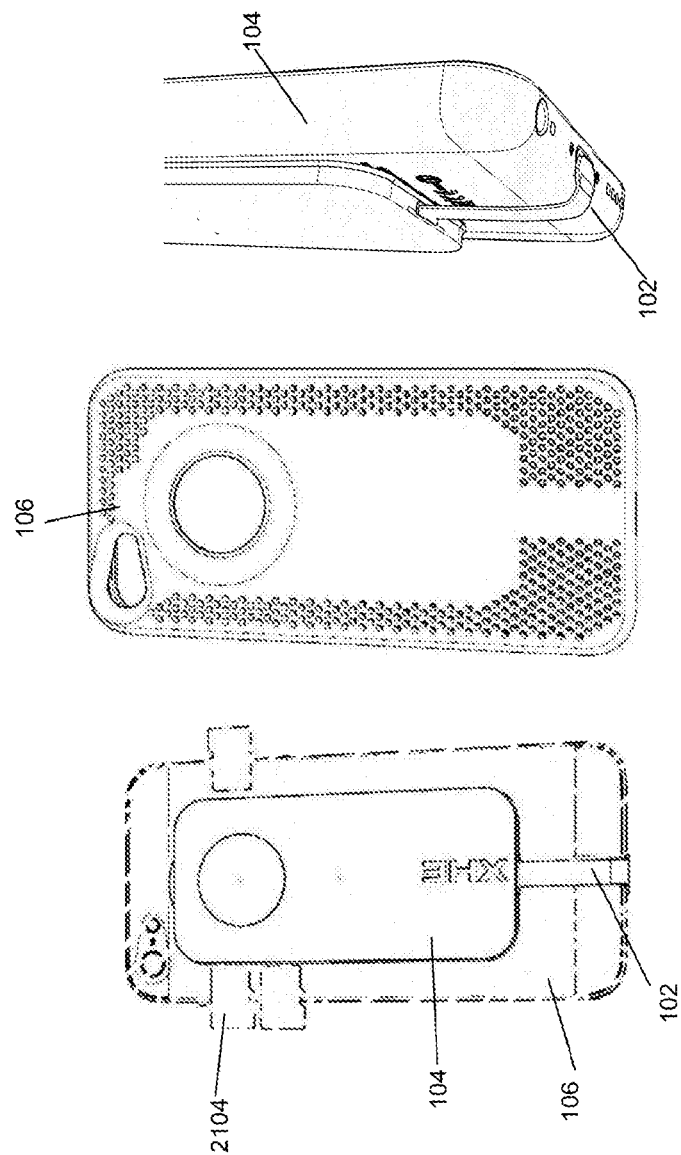

MULTIFUNCTION PERIPHERAL DEVICE WITH INTERCHANGEABLE CONNECTORS AND CASTS FOR MOBILE DEVICES

CROSS REFERENCE TO RELATED APPLICATIONS

The present invention is a continuation-in-part of U.S. Design application Ser. No. 29/514,035, filed Mar. 26, 2015, the entire content of which is hereby incorporated by reference in its entirety.

FIELD OF THE INVENTION

The present invention relates to a multifunction peripheral device that can be used with a wide variety of connectors, cases, and mobile devices in an interchangeable manner.

BACKGROUND

There are currently a wide variety of cases and peripheral devices design to be used with mobile devices. In many instances, the peripheral devices, such as memory, batteries and any other external feature such as sensors accessories of any kind are integrated and built into the case and are not removable. Thus, if the design of the mobile device changes or if a user purchases a different mobile device, the user must purchase a new case if the user desires to have the same functionality. Also, if the peripheral device integrated into the case fails or is otherwise damaged, the user must purchase an entirely new case because the peripheral device is not user replaceable.

Some cases allow users to replace certain peripherals in cases such as batteries. However, these cases typically only have peripherals that have a single function, such as a replaceable battery or replaceable memory. Also, such cases suffer the same limitations as other cases because the connector to the peripheral device is integrated into the case which may significantly increase the cost of the case itself and the ability to only repair or replace the malfunctioning feature.

Thus, there clearly exists a need for a multifunction peripheral device which can be used with a wide variety of replaceable cases with different designs and shapes for different phone brands styles and tablets, connectors, mobile devices, and operating systems. Such a system would allow a user to utilize the multifunction peripheral device along with any combination of cases, connectors, operating systems, and mobile devices without requiring replacement of the multifunction peripheral device without great cost to the user.

SUMMARY

The present invention provides a multifunction core for use with a wide variety of belt connectors, operating systems, mobile devices, and replaceable cases. The features of the multifunction core are controlled by a dedicated application program installed in the mobile device.

BRIEF DESCRIPTION OF THE DRAWINGS

FIG. 1 depicts a first embodiment of the multifunction peripheral system in an unassembled state.

FIGS. 6, 7A, and 7B depict additional views of the multifunction core of FIG. 1.

FIGS. 8A and 8B depict an exploded view of the multifunction core of FIGS. 6, 7A, and 7B.

FIGS. 15A-15F depict alternate embodiments of a replaceable cover compatible with the multifunction core depicted in FIG. 1.

FIG. 24 depicts a view of the multifunction core of FIG. 21 inserted into the replaceable cover of FIG. 19.

FIG. 25 depicts a rear view of the replaceable cover of FIG. 19.

FIG. 26 depicts an enhanced perspective view of FIG. 23.

DETAILED DESCRIPTION

Figure 2:
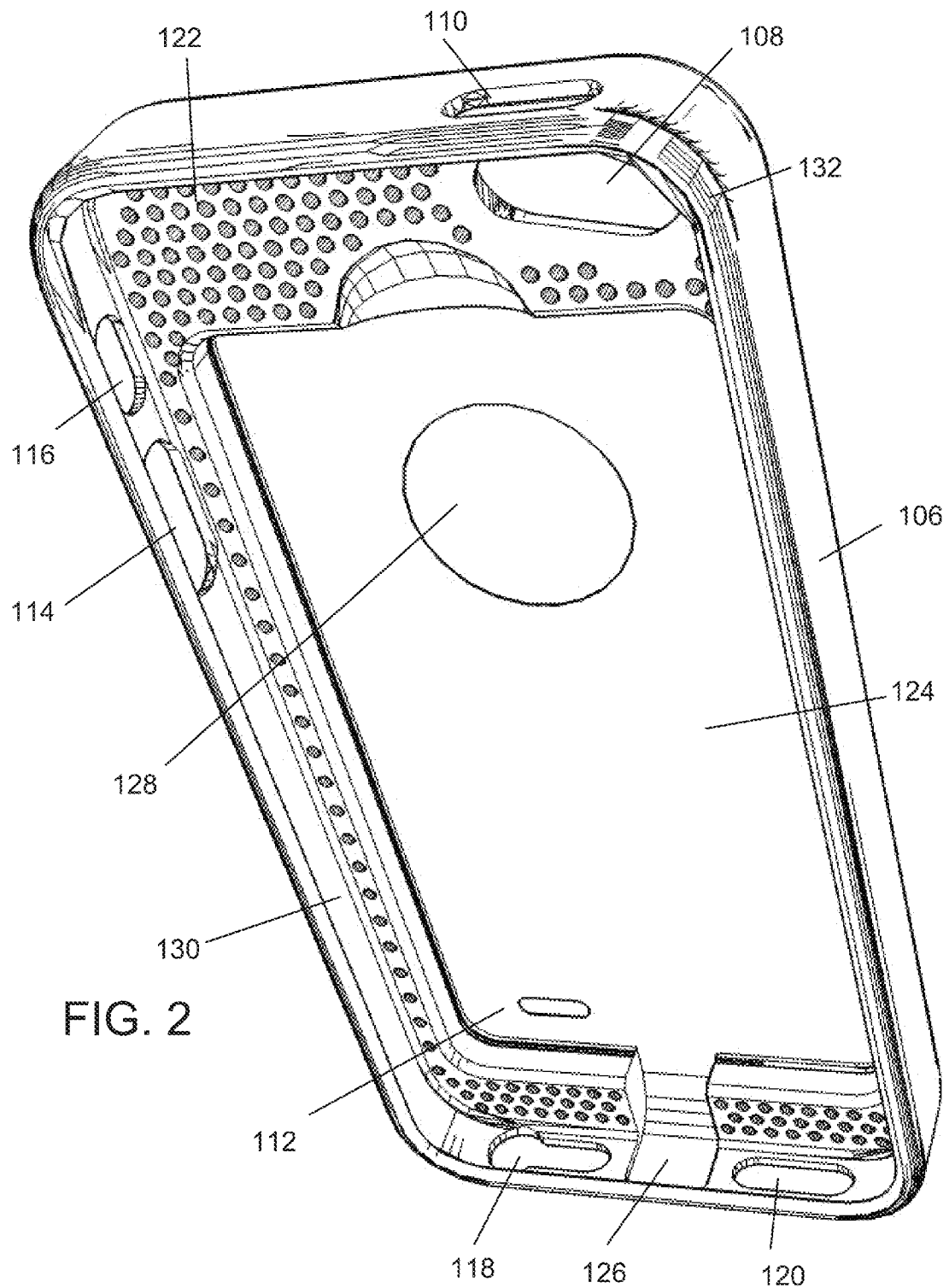
FIGS. 2 and 3 depict additional views of the replaceable cover of FIG. 1.

FIG. 1 depicts a first embodiment of the various components of the present invention in an unassembled state. As shown, the multifunction peripheral system 100 generally comprises belt connector 102, multifunction core 104, and replaceable cover 106. Each cover 106 is designed for a specific mobile device (not currently shown). For example, the replaceable cover 106 has multiple ports for different components of the mobile device such as camera port 108, headphone port 110, volume changer port 114, power port 116, microphone port 118, and speaker port 120. It should be obvious to one of ordinary skill in the art that any variety of combination of ports can be placed in replaceable cover 106 depending upon the configuration of the inserted device. Also, it should be obvious that the dimensions or material of construction of replaceable cover 106 can be modified to accommodate the needs of the user. For example, if a user is using replaceable cover 106 in sports, replaceable cover 106 may be formed from a thick, elastic material to better protect the inserted mobile device. In another instance, a user may desire a thin replaceable cover 106 more suitable for urban environments and frequent use.

In the embodiment depicted in FIG. 1, replaceable cover 106 comprises a plurality of cooling holes 122 for preventing the mobile device from overheating when placed in replaceable cover 106. However, it should be obvious to one of ordinary skill in the art that cooling holes 122 can be omitted from replaceable cover 106 if the mobile device is user in, for example, a wet or damp environment.

Replaceable cover 106 further comprises core recess 124 and belt connector recess 126 which are sized to accommodate core 104 and belt connector 102, respectively, when placed therein. An alternate perspective view of replaceable cover 106 showing core recess 124 and belt connector recess 126 are depicted in FIG. 2. As shown, core recess 124 and belt connector recess 126 are contiguous. Preferably, core recess 124 is substantially the same depth as the thickness of multifunction core 104. Core recess 124 may further comprise an extension to allow the multifunction core 104 to be easily removable from core recess 124 using a finger.

Figure 3:
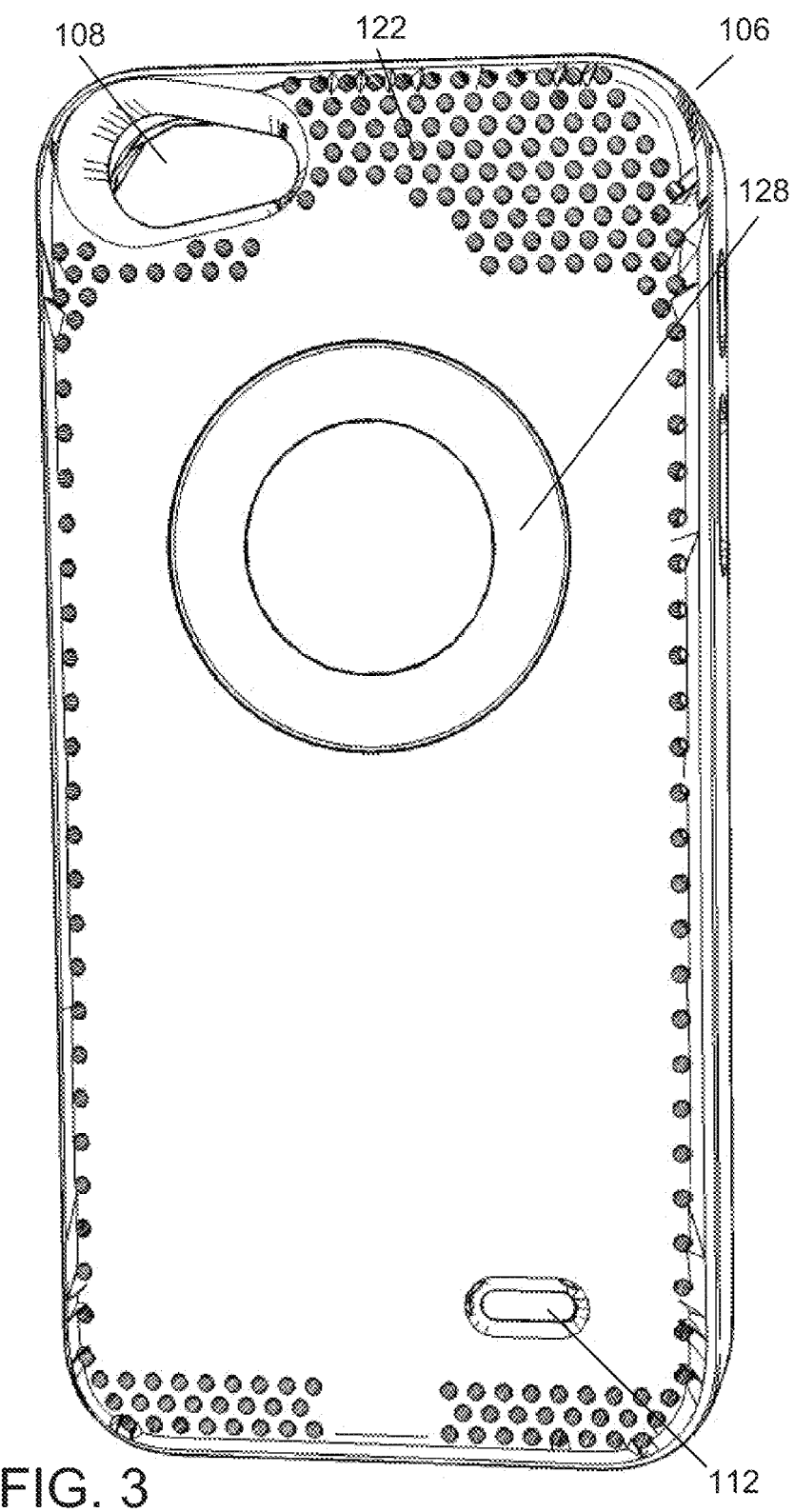

Replaceable cover 106 also preferably comprises light port 128 within core recess 124. As will be described later, multifunction core 104 preferably has a lighting element that can be seen through light port 128 when the lighting element is illuminated. A view of replaceable cover 106 from the rear showing light port 128 is depicted in FIG. 3.

Replaceable cover 106 further comprises mobile device recess 130 which is located on top of and surrounds core recess 124. Mobile device recess 130 is sized to snugly accommodate a specific mobile device therein. Replaceable cover 106 further comprises lip 132 around the edge of replaceable cover 106 which secures a mobile device when placed therein as is known in the art.

Figure 4:
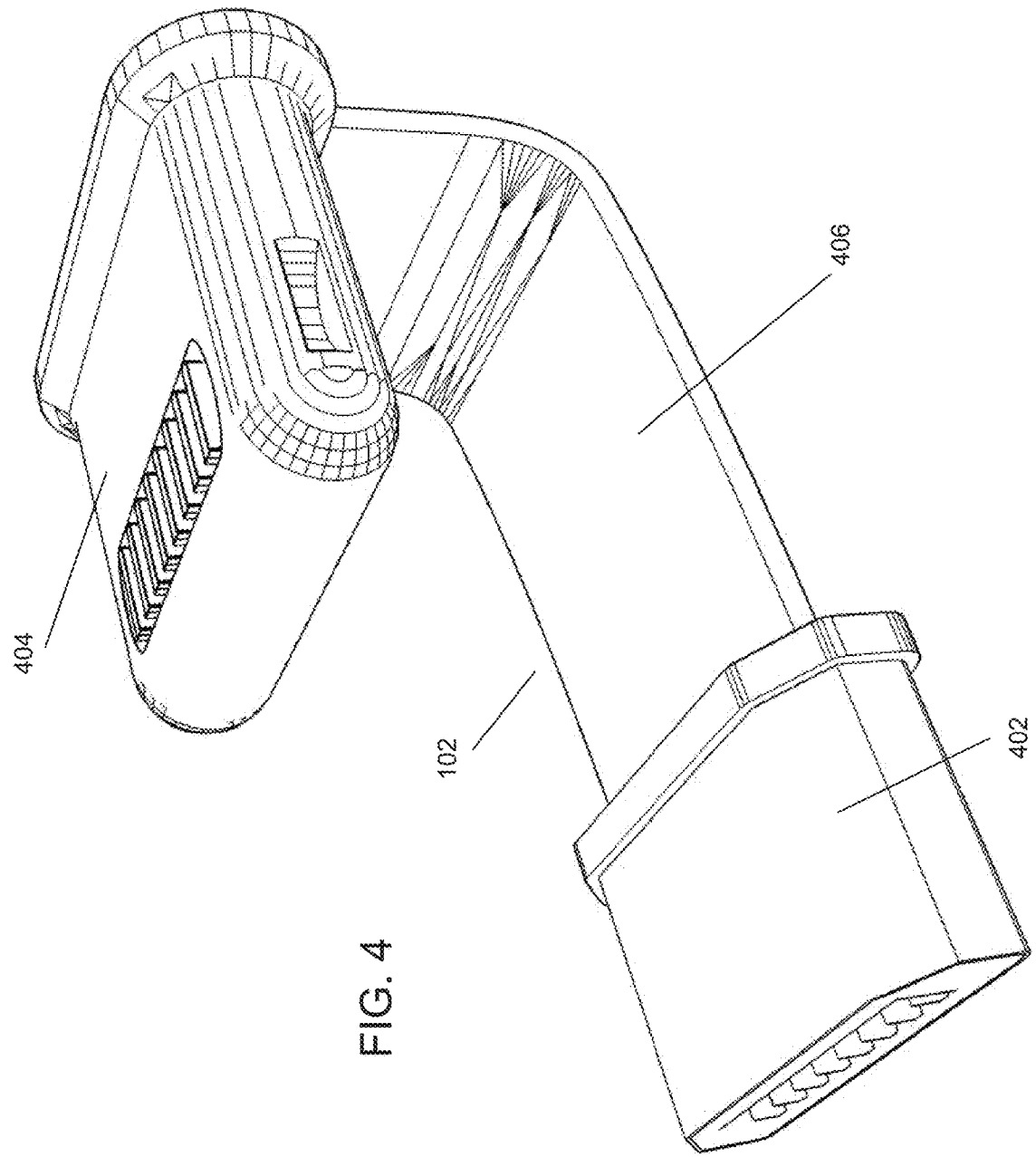
FIGS. 4 and 5 depict additional views of the belt connector of FIG. 1.
Figure 5:
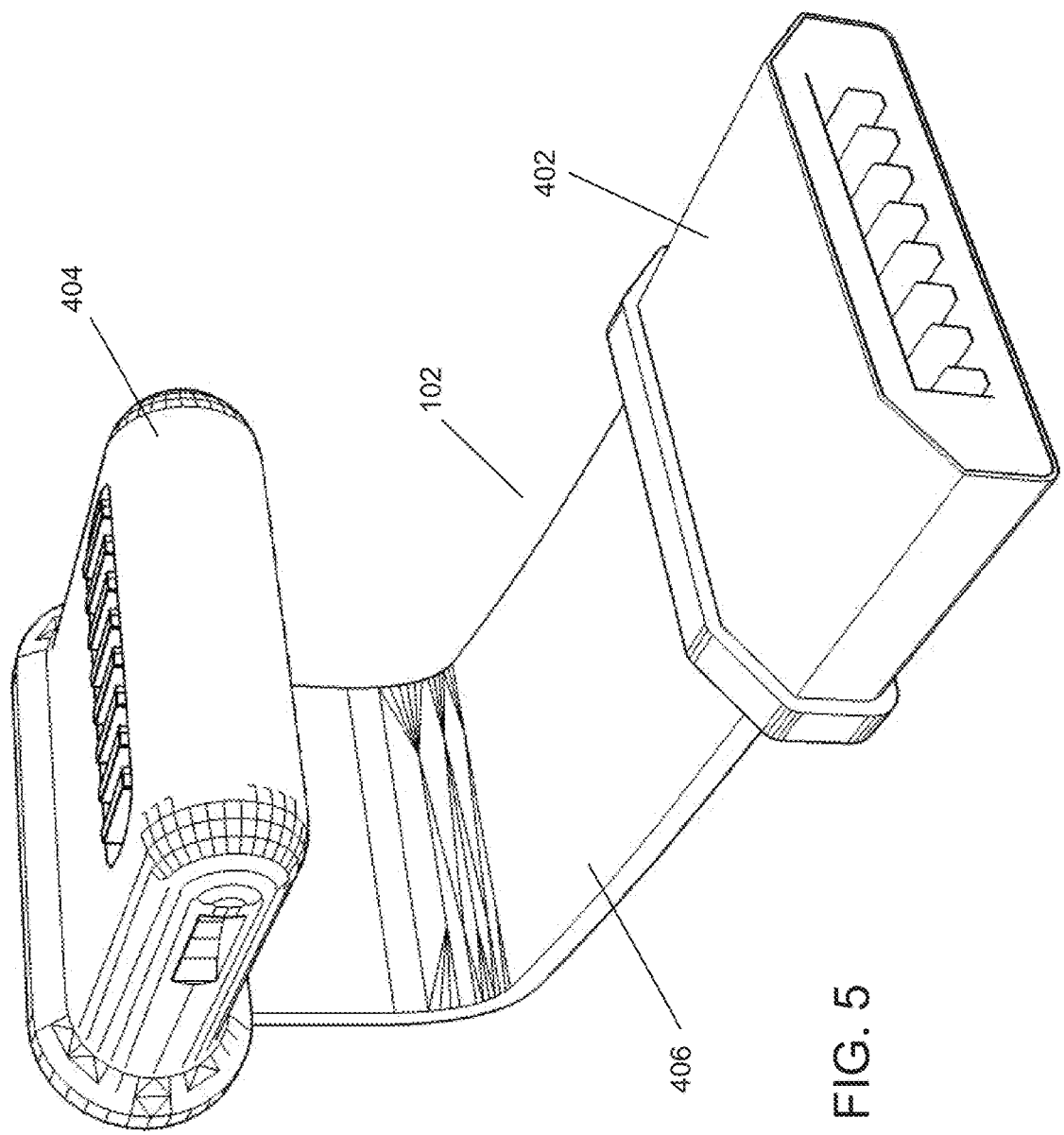

Enhanced perspective views of belt connector 102 are depicted in FIGS. 4 and 5. As shown, belt connector 102 generally comprises core connector 402 mobile device connector 404 which are coupled together via flexible belt 406. Generally, belt connector 102 allows multifunction core 104 to communicate with a mobile device as will be described later. Belt connector 102 has appropriate dimensions so that it snugly fits in belt connector recess 126. Further, belt connector 102 may be manufactured in different lengths and widths to fit a large variety of mobile devices.

Core connector 402 may utilize any type of male or female connector shape. Examples of suitable connectors for core connectors 402 include USB A-Type, USB B-Type, USB C-Type, Micro-USB A, Micro-USB B, Micro-USB C, Micro USB ABC, USB Mini-b (4 or 5 pin), USB 3.0 A-Type, USB 3.0 B-Type, and USB 3.0 Micro B, 30-pin Apple® connector, or an Apple® Lightning™ Connector.

In some embodiments, core connector 402 may utilize a proprietary male connector shape in order to inhibit other third-party competitors from designing products to be utilized with belt connector 102 and multifunction core 104.

The connector type for mobile device connector 404 is chosen to be a male port to properly mate with the female data connection/charging port of the attached mobile device. Thus, in a preferred embodiment, core connector 402 may utilize the same type of connector whereas the connector type for mobile device connector 404 will vary based upon the type of mobile device to be connected. This arrangement allows the multifunction core 104 to be used with a wide variety of mobile devices as will be explained later.

Figure 6:
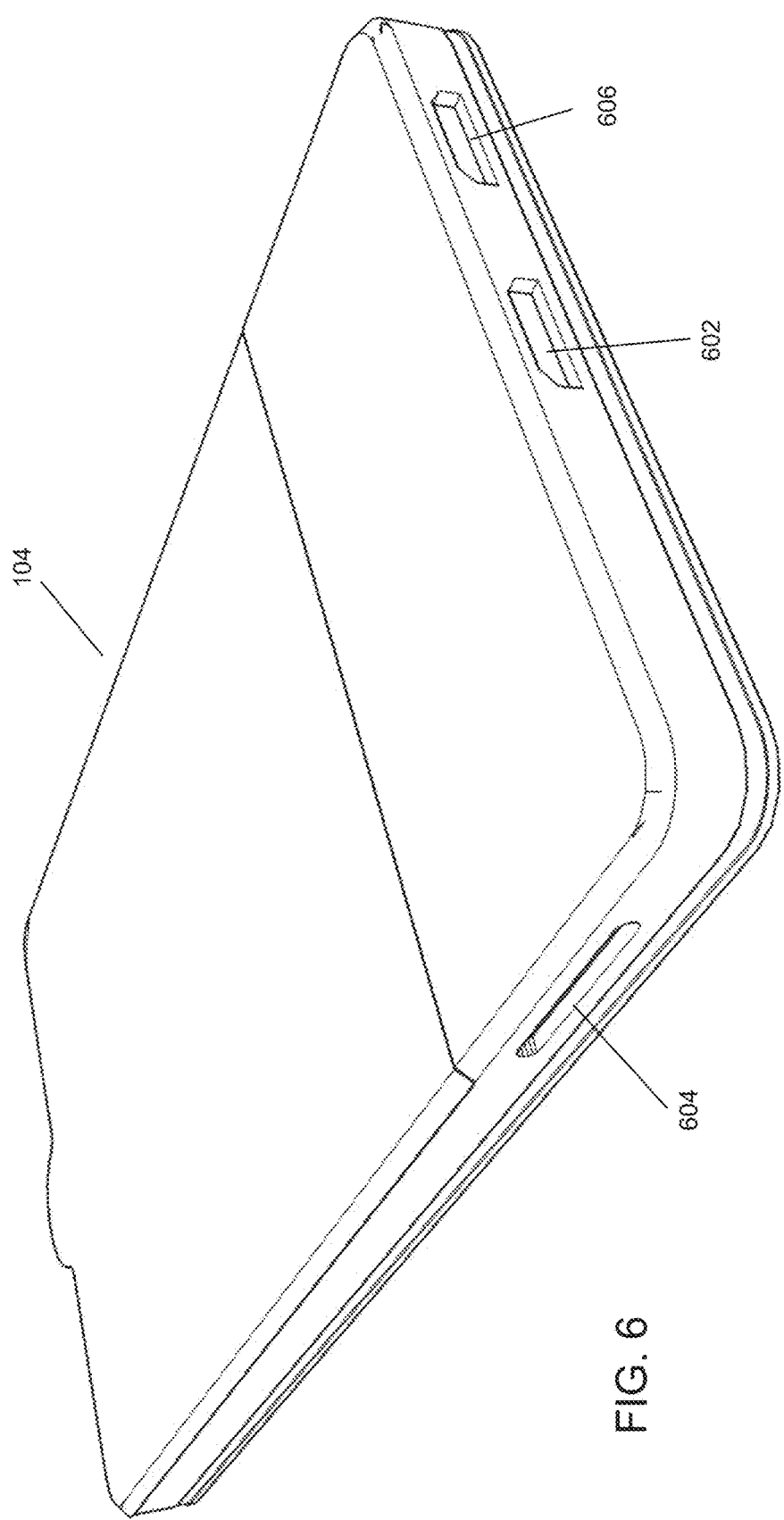

A front perspective view of multifunction core 104 is depicted in FIG. 6. As shown, multifunction core 104 is generally rectangular in shape and comprises belt connection port 602 which mates with core connector 402 as will be shown later. Multifunction core 104 is preferably between 20 mm to 60 mm wide and between 20 mm and 125 mm long. However, it should be obvious that the dimensions of multifunction core 104 are not limited to these ranges.

Multifunction core 104 also comprises memory card reader 604 which allows a memory card to be inserted into multifunction core 104 to provide additional memory or have a chip base memory embedded into the core PCBA board. Memory card reader 604 can accept a single memory card or multiple memory cards depending upon the capabilities of memory card reader 604. Further, permanent memory can also be embedded in multifunction core 104 which is not removable. Multifunction core 104 also preferably includes a charging port 606 which can be used for charging core 606 using a custom charger or a docking port.

Figure 7A:
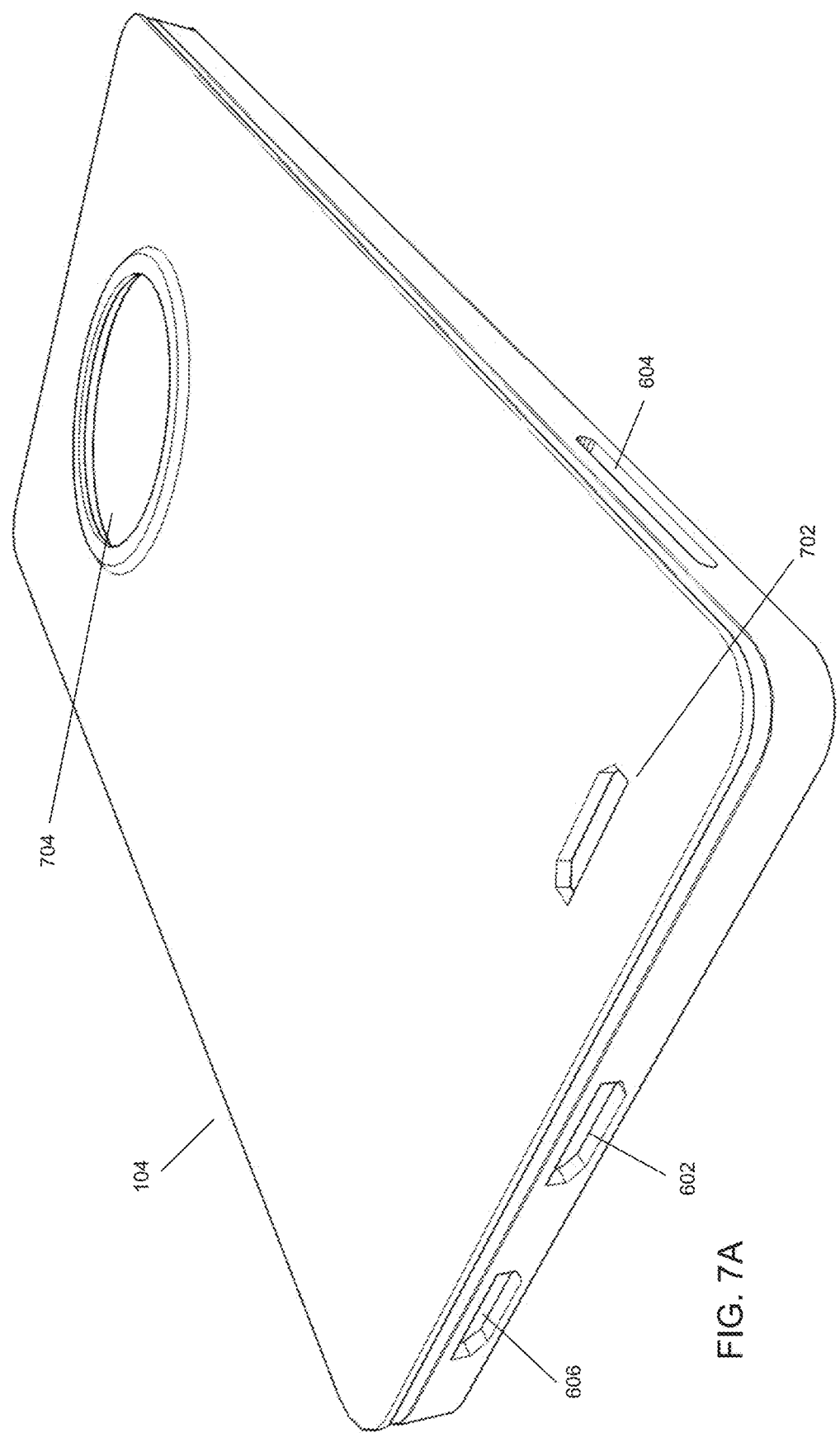

FIGS. 7A and 7B depict a rear view of multifunction core 104 showing additional features. Multifunction core 104 preferably comprises charging port 702 and lighting element 704. Charging port 702 can be used to simultaneously charge multifunction core 104 and any attached mobile device. Replaceable cover 106 is designed such that lighting element 704 aligns with light port 128 when the core is inserted into replaceable cover 106. Further, replaceable cover 106 may also comprise a port corresponding to the location of charging port 702 so that the charging port 702 can be accessed. In some embodiments, multifunction core 104 may also comprise a speaker (not shown) and a corresponding port on replaceable cover 106 so that emitted sound is not distorted.

Lighting element 704 is preferably a 1" smart LED panel constructed from a PCBA board with 1 to 100 LED diodes. The smart LED panel is a low consumption thin (preferably around 2 mm) light emitter that uses less energy than LED diodes. However, LED diodes can also be used. Lighting element 702 has many possible uses which include providing light for taking photos and video in low light, functioning as a flashlight, and functioning as a music equalizer, and emergency light strobe. These features of lighting element 704 are controlled via a mobile application on the mobile device or a physical embedded button that will be described in more detail later.

Figure 8B:
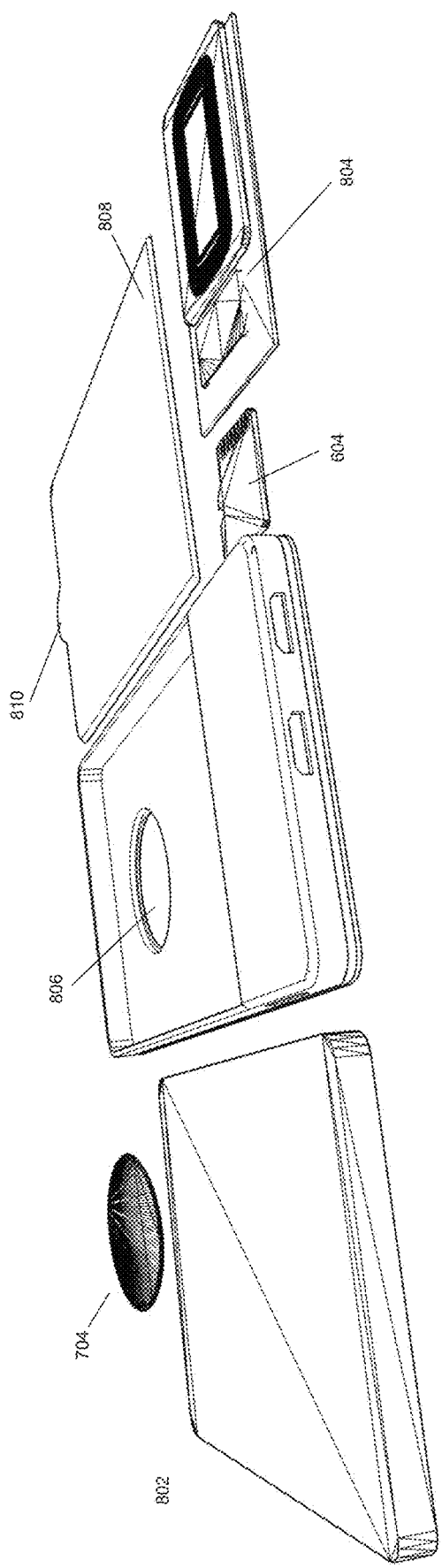

FIGS. 8A and 8B depict an exploded view of multifunction core 104 showing some of the internal components not viewable in FIG. 6, 7A, or 7B. Multifunction core 104 preferably further comprises battery 802 and wireless charger 804. Also, lighting element 704 is viewable through core port 806. Lighting element 704, battery 802, and wireless charger 804 are sealed inside of multifunction core 104 using cover 808. However, it should be obvious to one of ordinary skill in the art that cover 808 could be removable to allow a user to replace internal components such as battery 802.

Battery 802 is preferably a 500 mAh-4000 mAh battery that provides additional battery life to the attached mobile device. Wireless charger 804 is preferably an electromagnetic or RF base wireless charging element such as a Qi charger or any other brand which enables wireless charging of both battery 802 and the mobile device using a wireless power transmission pad.

It should be obvious to one of ordinary skill in the art that various other peripheral devices can also be incorporated into multifunction core 104. For example, multifunction core 104 could also comprise an RFID chip or an NFC chip to allow for mobile payments. In another example, multifunction core 104 may comprise an IR blaster to allow multifunction core 104 to act as a remote control. In another example, multifunction core 104 may comprise of a chip base camera, humidity sensor, temperature sensor, pressure sensor, measurement sensor, teaser electric pulse module, and any other sensor base module.

Cover 808 may additionally comprise tab 810 which allows multifunction core 104 to easily be removed from core recess 124 by using a single finger.

Figure 9:
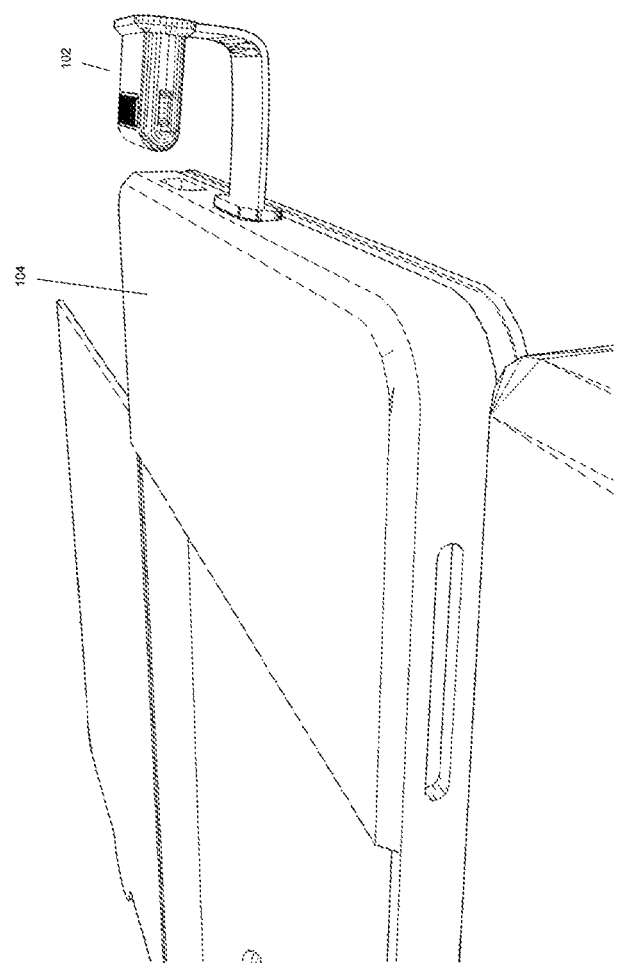
FIG. 9 depicts the belt connector connected to the multifunction core.
Figure 10:
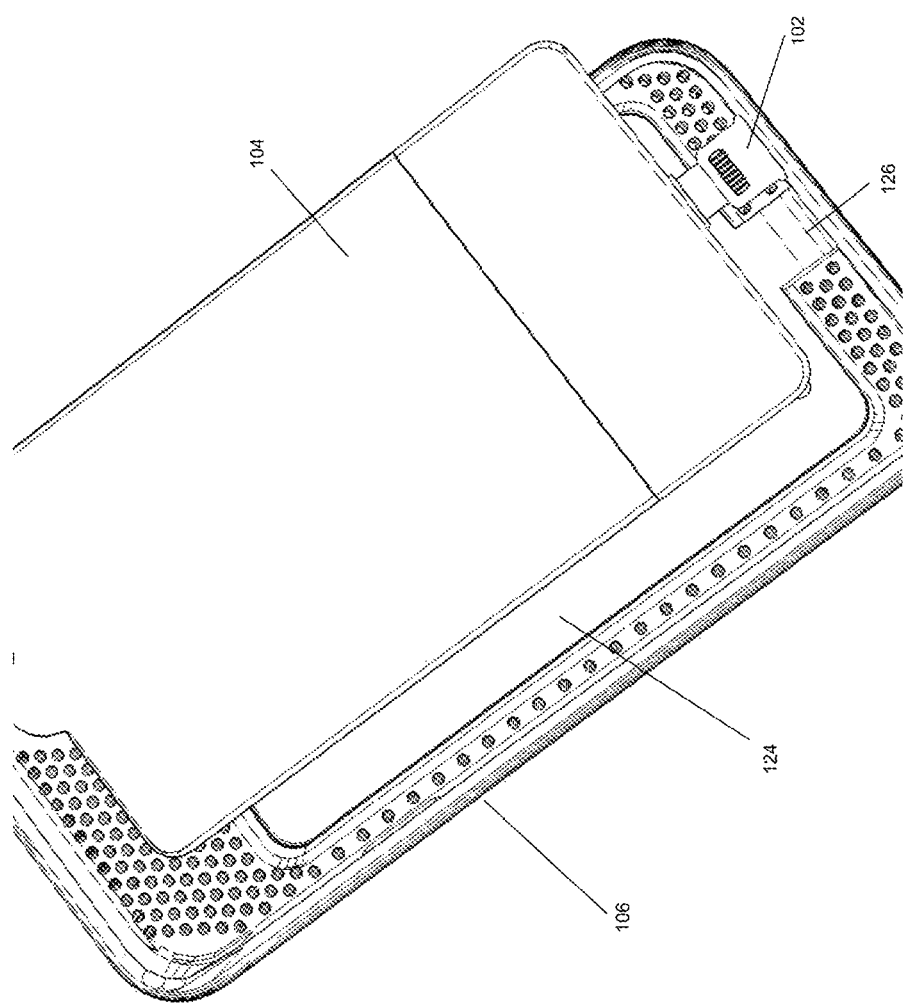
FIGS. 10 and 11 depict the connected multifunction core and belt connector of FIG. 9 being inserted into the replaceable cover.
Figure 11:
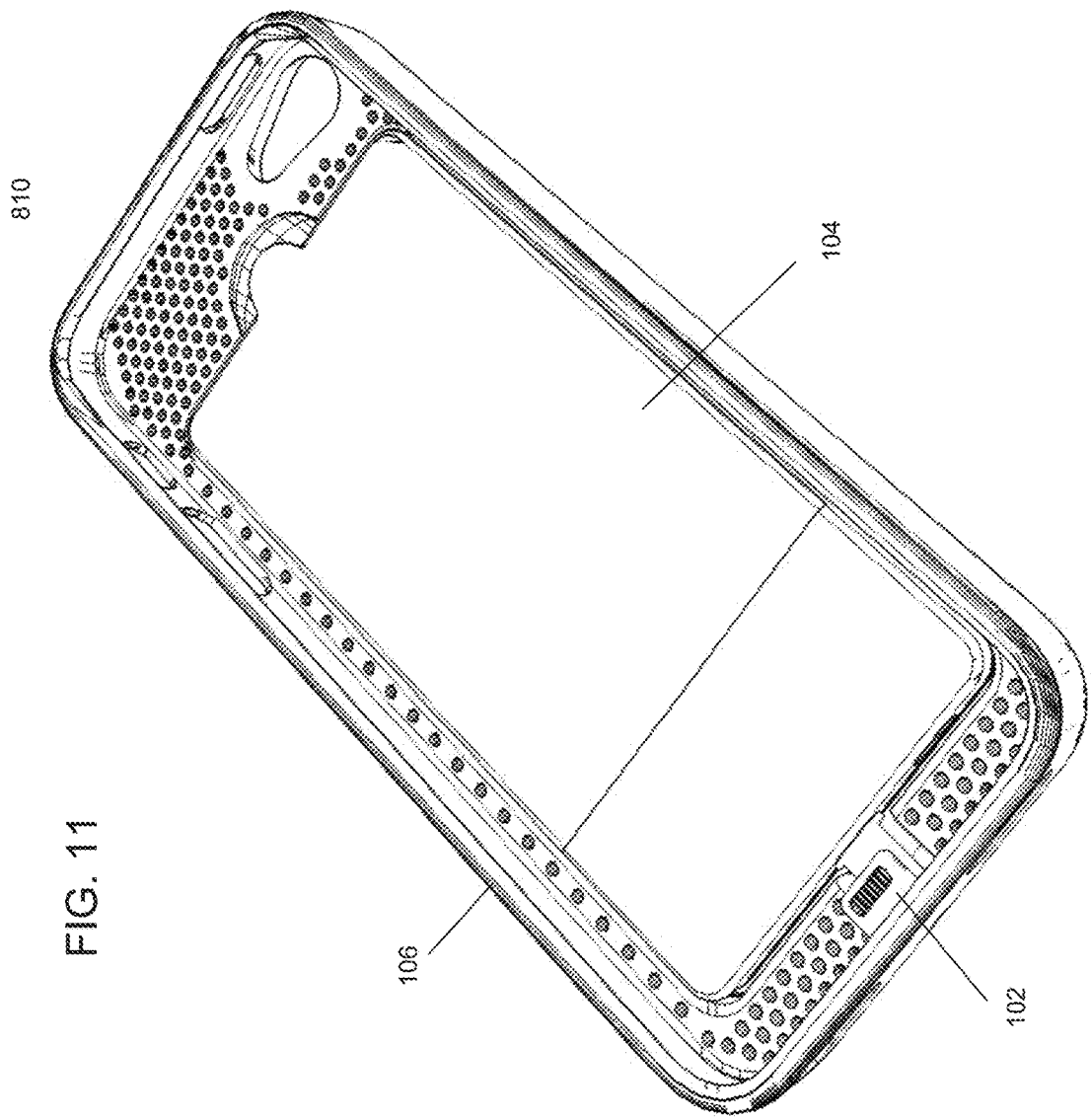

The connection of belt connector 102 to multifunction core 104 is depicted in FIG. 9. As shown, core connector 402 is mated with belt connection port 602. The connected devices can then be placed into replaceable cover 106 as depicted in FIGS. 10 and 11. A mobile device can be connected to mobile device connector 404 and secured within replaceable cover 106 using lip 132. Because the mobile device rests on top of multifunction core 104, the mobile device also secures multifunction core 104 within replaceable cover 106.

Figure 12A:
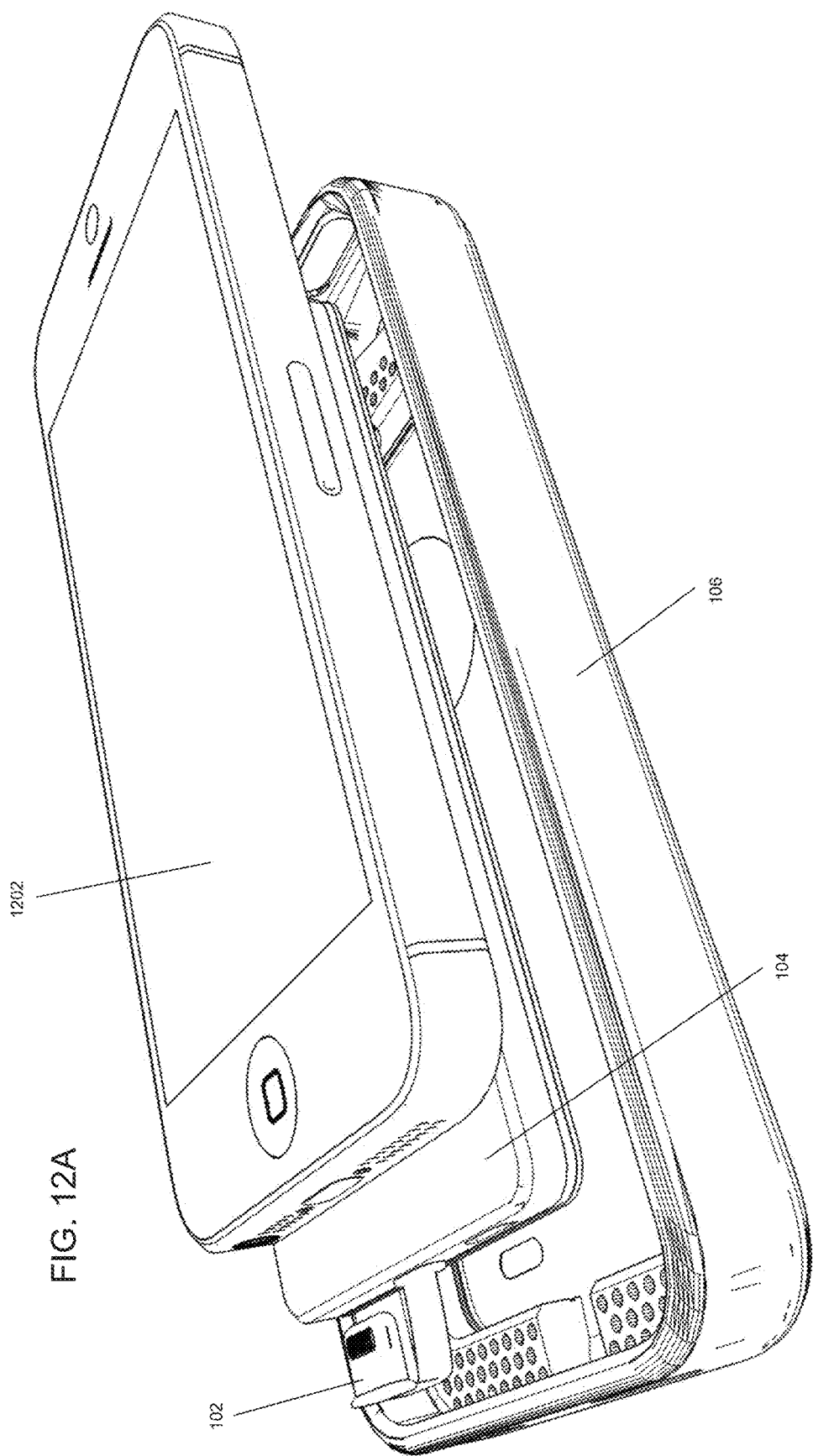
FIGS. 12A and 12B depict the multifunction core being connected to a mobile device via the belt connector.
Figure 12B:
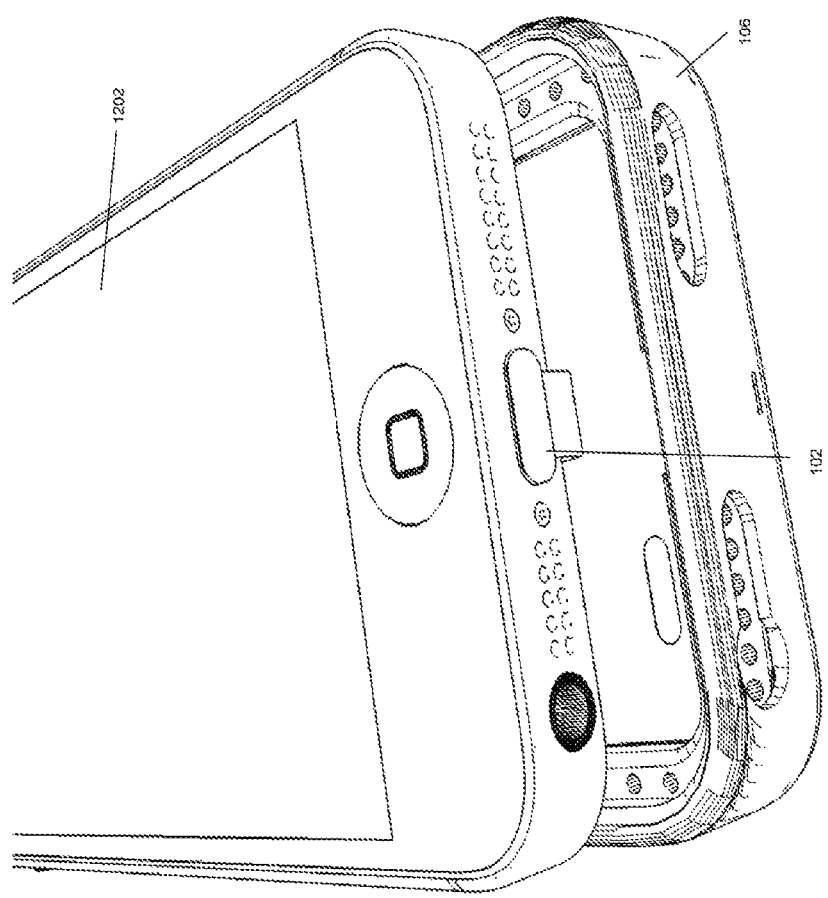

The connection of multifunction core 104 to mobile device 1202 using belt connector 102 is depicted in FIGS. 12A and 12B outside of replaceable cover 102 for clarity. As depicted, mobile device connector 404 mates with the charging/data port of the mobile device 1202.

Figure 13:
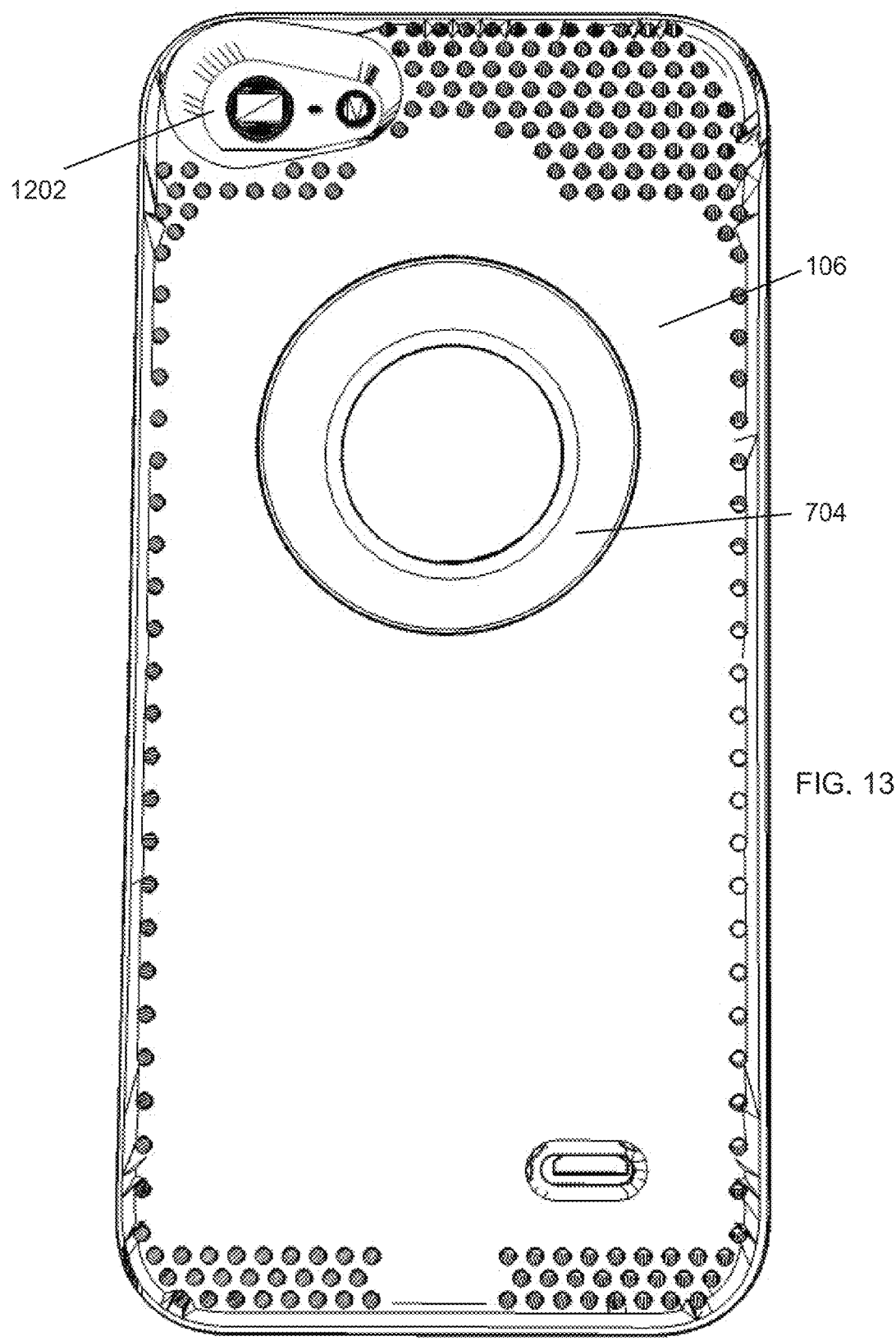
FIGS. 13 and 14 depict views of the multifunction peripheral system after assembly.
Figure 14:
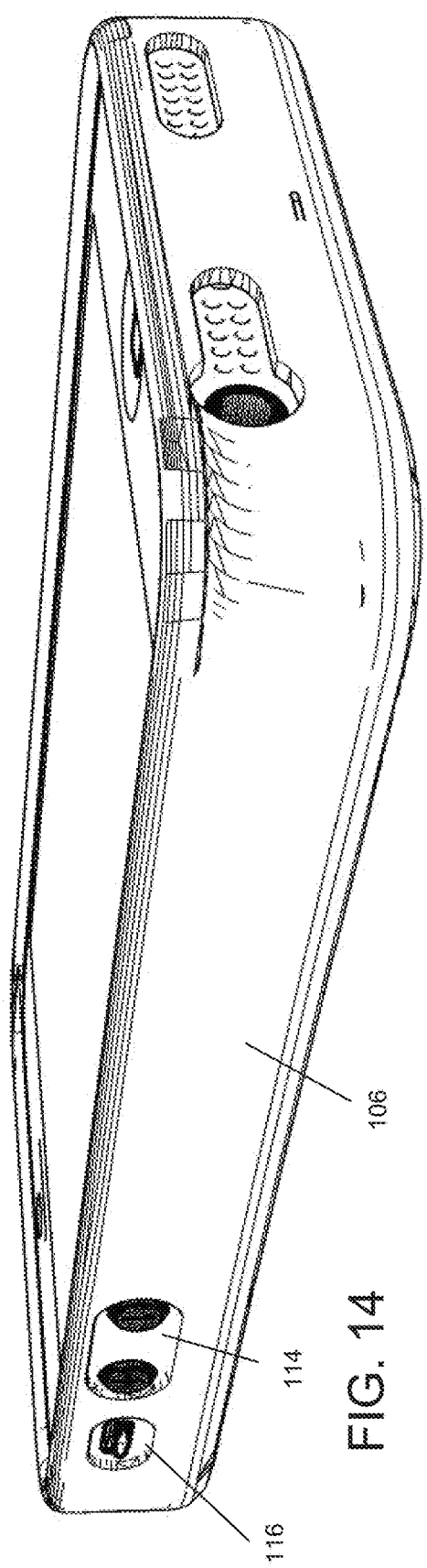

A rear view of expandable cover 106 after insertion of multifunction core 104 and mobile device 1202 is depicted in FIG. 13. As shown, lighting element 704 is viewable through light port 128 and the camera of mobile device 1202 is viewable through camera port 108. Similarly, as depicted in FIG. 14, the volume keys and power button of mobile device 1202 are visible/usable through volume change port 114 and power port 116, respectively.

Figure 15A:
Figure 15B:
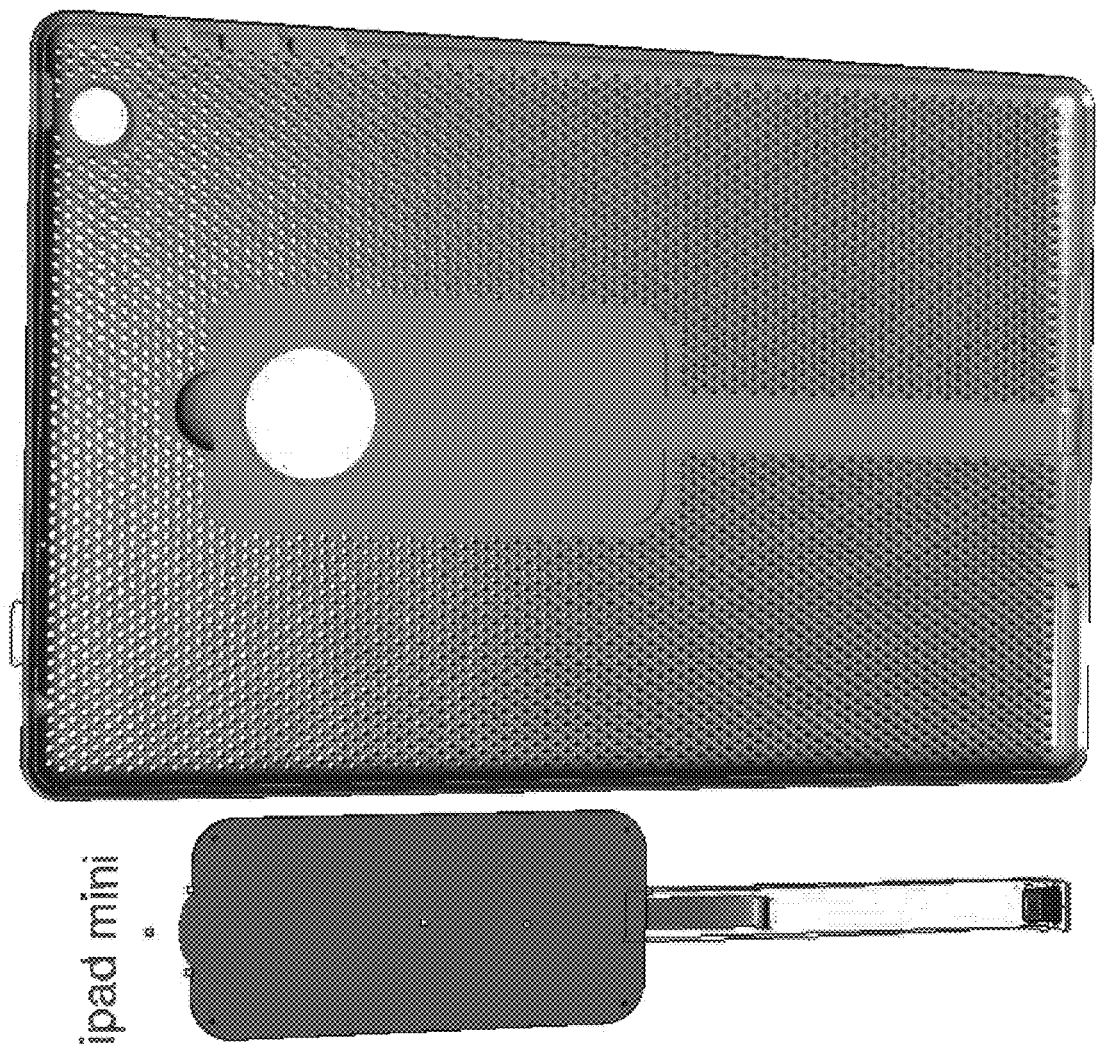

Further replaceable covers compatible with the same multifunction core 104 are depicted in FIGS. 15A-15F. For example, the replaceable cover 106 depicted in FIG. 15A is compatible with any tablet, such as an iPad™ or an Android™ based tablet. The replaceable cover 106 comprises all of the appropriate ports for the tablet and a recess for multifunction peripheral 104 and a belt connector 102 compatible with the tablet. The replaceable covers depicted in FIGS. 15B and 15C are compatible with different sized phones/tablets which have different features and dimensions. However, it should be noted that the same multifunction core 104 can be used in each of these covers in combination with a different size belt connector 102. This enables a user to use the same multifunction core 104 with a wide variety of mobile devices 1202 (e.g., tablets, cellular phones, laptops, etc.). Also, because the multifunction core 104 and the belt connector 102 are not integrally formed with replaceable cover 106, a user can easily change the replaceable cover (e.g., made of different materials or colors) without having to replace the multifunction core 104. The replaceable cover 106 can also be produced much more cheaply than other covers because there are no integrated electronics.

Another advantage that the present invention provides is that belt connector 102, multifunction core 104, and replaceable cover 106 can all be sold separately as different components or integrated into a kit for retail. This provides much greater flexibility for both the consumer and the retailer. For example, a user that owns both a tablet and a cellular telephone can purchase a single multifunction core 104, two belt connectors 102, and two replaceable covers 106. The user can then swap the single multifunction core 104 between the tablet and the cellular telephone. However, a device that is a heavy power user may opt to buy a multifunction core 104 for both the tablet and the cellular telephone. It should be apparent to one of ordinary skill in the art the many advantages of this increased flexibility.

An additional benefit to the producer of belt connector 102, multifunction core 104, and replaceable cover 106 is that they do not have to be made at the same facility since they are not integrated. This allows the manufacturer greater flexibility in choosing where belt connector 102, multifunction core 104, and replaceable cover 106 are produced. For example, the manufacturer could have the replaceable covers 106 produced at a factory that specializes in cell phone cases whereas the production of the multifunction core 104 can be accomplished by an electronics factory. This is particularly advantageous because in the current market there are very few facilities that would be able to manufacture belt connector 102, multifunction core 104, and replaceable cover 106.

Figure 16:
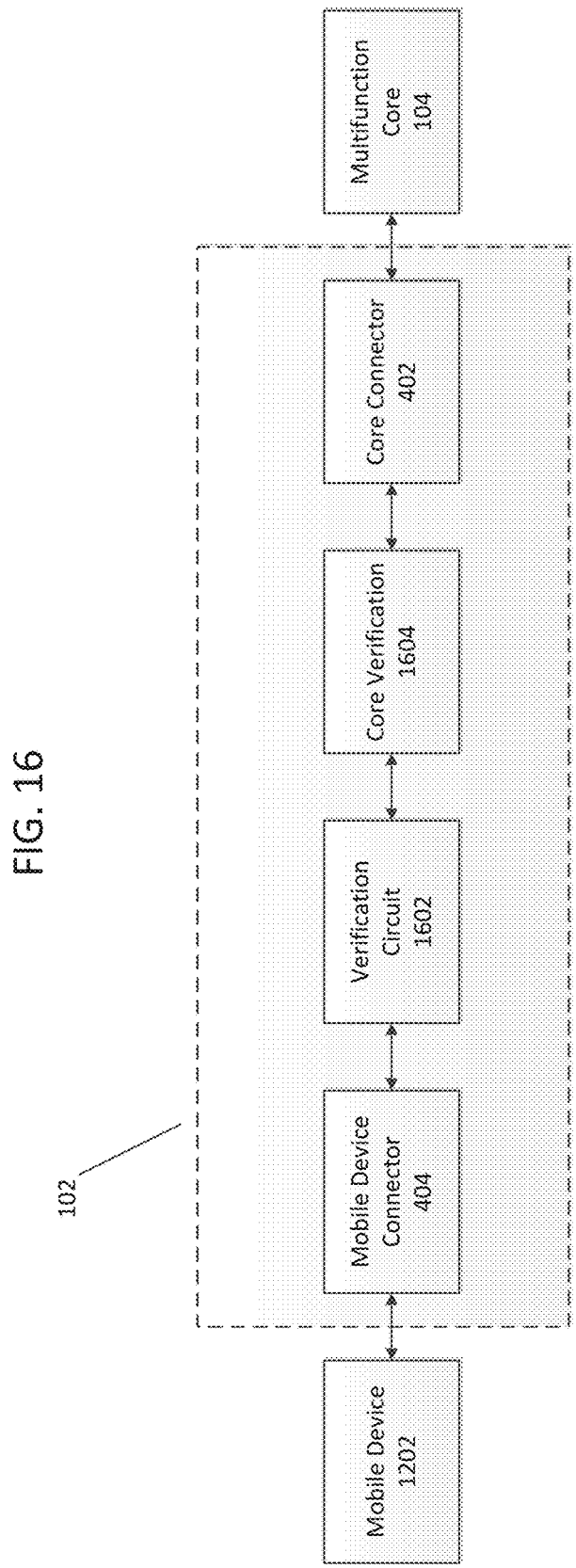
FIG. 16 depicts a schematic diagram of the components of the belt connector.

The additional features and functionality that multifunction core 104 and belt connector 102 provide to mobile device 102 will be explained with reference to the following block diagrams. First, referring to FIG. 16, depicted is a block diagram showing the functionality provided by belt connector 102. Belt connector 102 comprises verification circuit 1602 which connects mobile device 1202 to multifunction core 104 only if mobile device connector 404 is a valid connector. Thus, verification circuit 1602 prevents knockoff belt connectors 102 from being made.

Similarly, belt connector 102 may, in some embodiments, comprise core verification circuit 1604 which verifies that the multifunction core 104 connected to core connector 402 is a valid and approved multifunction core. For example, core verification circuit may request an encrypted message or code from multifunction core 104 upon connection to verify the attached multifunction core 104.

Figure 17:
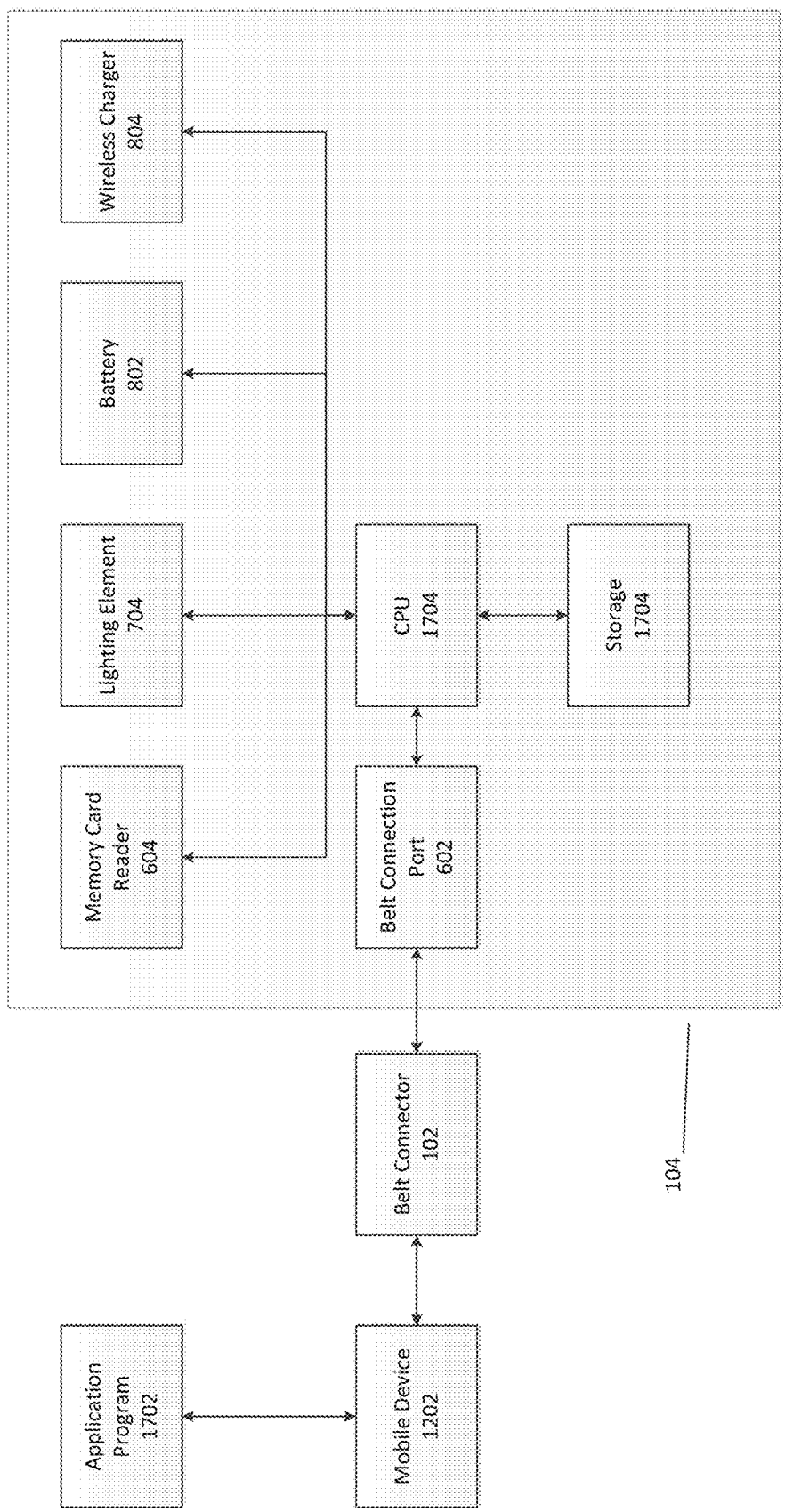
FIG. 17 depicts a schematic diagram of the components of the multifunction core.

FIG. 17 depicts a schematic diagram of the components of multifunction core 104. First, when multifunction core 104 is connected to belt connector 102, verification data store in memory 1706 is transmitted to core verification circuit 1604 for verification. If the multifunction core 104 is verified, connection is established between multifunction core 104 and mobile device 1202. If multifunction core 104 does not recognize mobile device 1202, CPU 1704 first detects the operating system installed on mobile device 1202 and then transmits a link or data to mobile device 1202. This causes a screen to pop-up on mobile device 1202 which allows a user to download application program 1702.

Once a user of the mobile device downloads and installs the appropriate application program 1702, the application program 1702 notifies the CPU 1704 that the application program has been installed. As a result, CPU 1704 adds identification data for mobile device 1702 to memory 1706. This process is repeated for every mobile device that has not been previously attached to multifunction core 104.

A user of mobile device 1202 can use the application program 1702 to control any of the peripherals located within multifunction core 104. For example, the application program 1702 can be used to cause a speaker on multifunction core 104 to emit music. Application program 1702 can also be used to alter system functions such as picture taking. For example, application program 1702 can be programmed to cause lighting element 704 to flash every time mobile device 1202 takes a picture. Multifunction core 104 may alternately comprise one or more physical buttons which can be used to interact with the multifunction core 104 instead of the application program 1702.

Application program 1702 also provides an interface which allows a user to browse files stored on a memory card inserted into memory card reader 604 using a file browser or to view the status of the charge on battery 802 or the connectivity of wireless charger 804. As another example, application program 1702 can be used to prevent battery 802 from charging mobile device 1202 if additional battery power is not needed.

Figure 20:
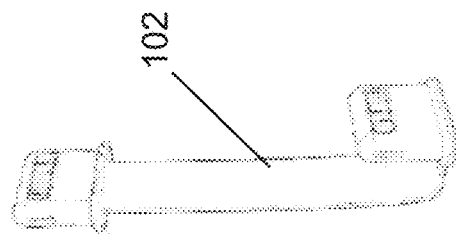
FIG. 20 depicts an alternate view of the belt connector.
Figure 19:
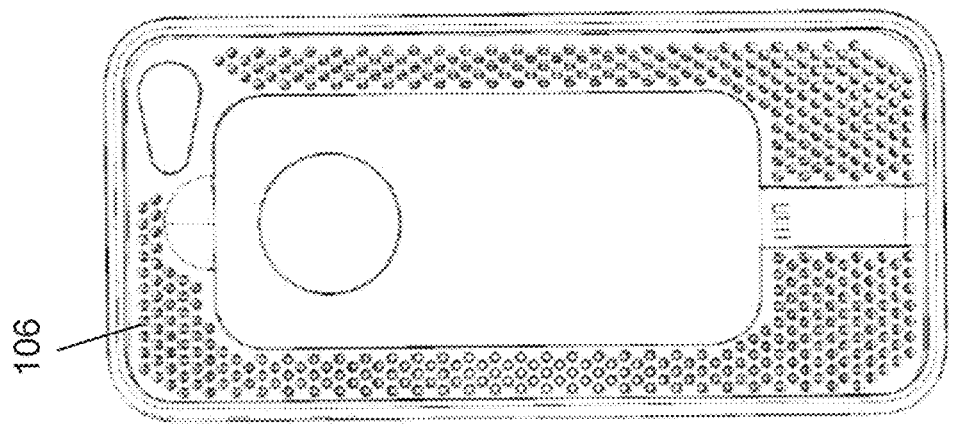
FIG. 19 depicts an alternate view of the replaceable cover.
Figure 18:
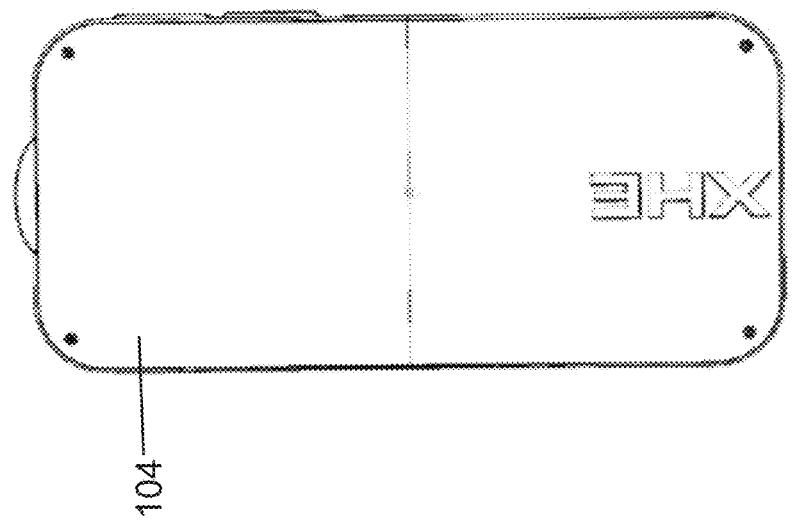
FIG. 18 depicts an alternate embodiment of the multifunction core.
Figure 23:
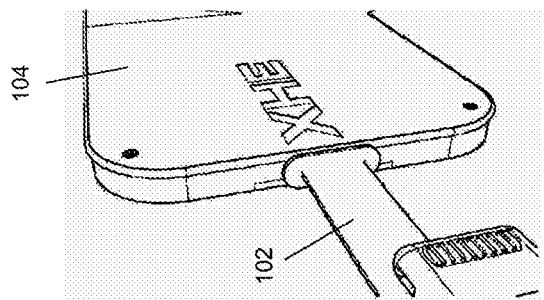
FIG. 23 depicts a view of the multifunction core of FIG. 18 connected to the belt connector of FIG. 20.
Figure 22:
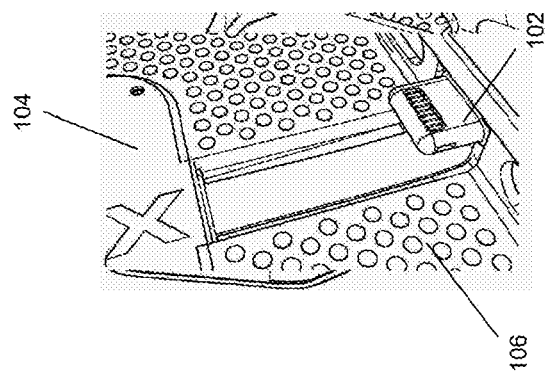
FIG. 22 depicts a view of the elements of FIGS. 18-20 in an assembled state.
Figure 21:
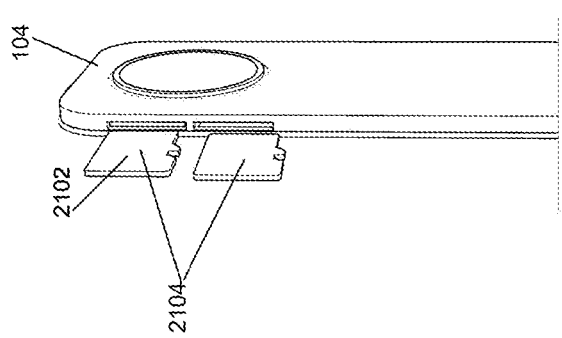
FIG. 21 depicts a side elevation view of the multifunction core of FIG. 18 with memory cards.
Figure 29:
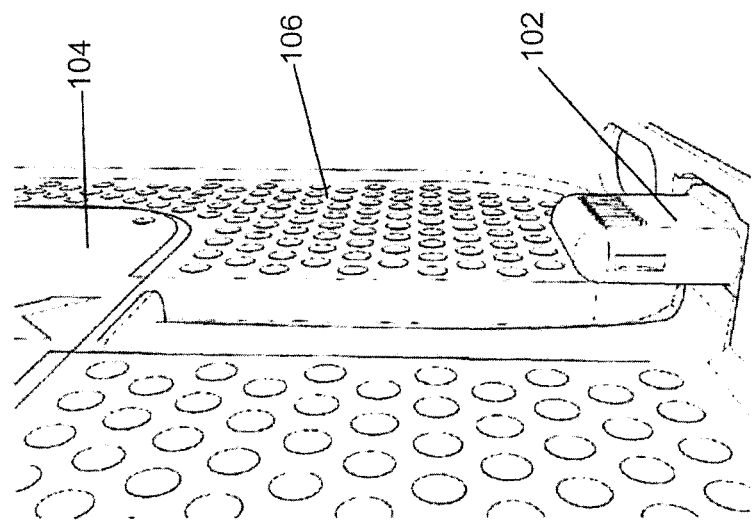
FIG. 29 depicts an alternate view of FIG. 22.
Figure 28:
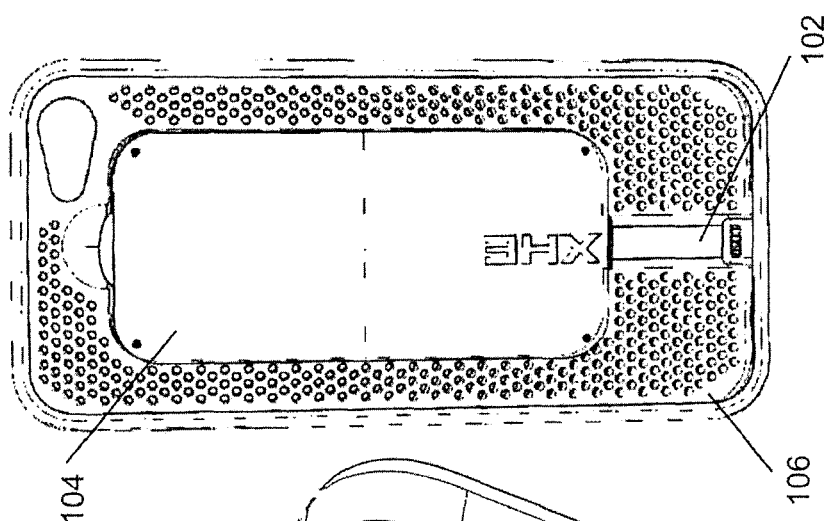
FIG. 28 depicts an alternate view of FIG. 27.

FIGS. 18-30 depict alternate views of belt connector 102, multifunction core 104, and replaceable cover 106. First, with reference to FIG. 18, multifunction core 104 is depicted with sample branding along the bottom. Similarly, FIG. 19 shows a front view of an alternate embodiment of replaceable cover 106 and FIG. 20 depicts a perspective view of an alternate embodiment of belt connector 102. For a more succinct description, only the differences between the multifunction peripheral system 100 shown in FIGS. 18-30 and the multifunction peripheral system 100 shown in FIGS. 1-14 will be described. As depicted in FIGS. 21 and 24, multifunction core 104 comprises memory card slots 2102 for accommodating memory cards 2104. Memory cards 104 may be any type of commercially available memory, such as SD cards or mini-SD cards which utilize flash memory. Further, multifunction core 104 may have any number of memory card slots 2102 located anywhere on multifunction core 104.

Figure 27:
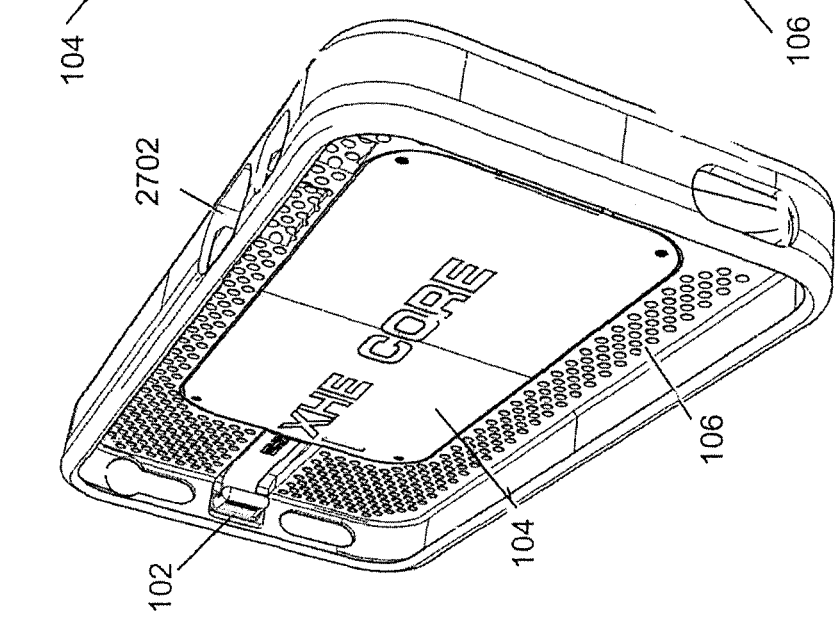
FIG. 27 depicts a perspective view of the elements of FIGS. 18-20 in an assembled state.
Figure 30:
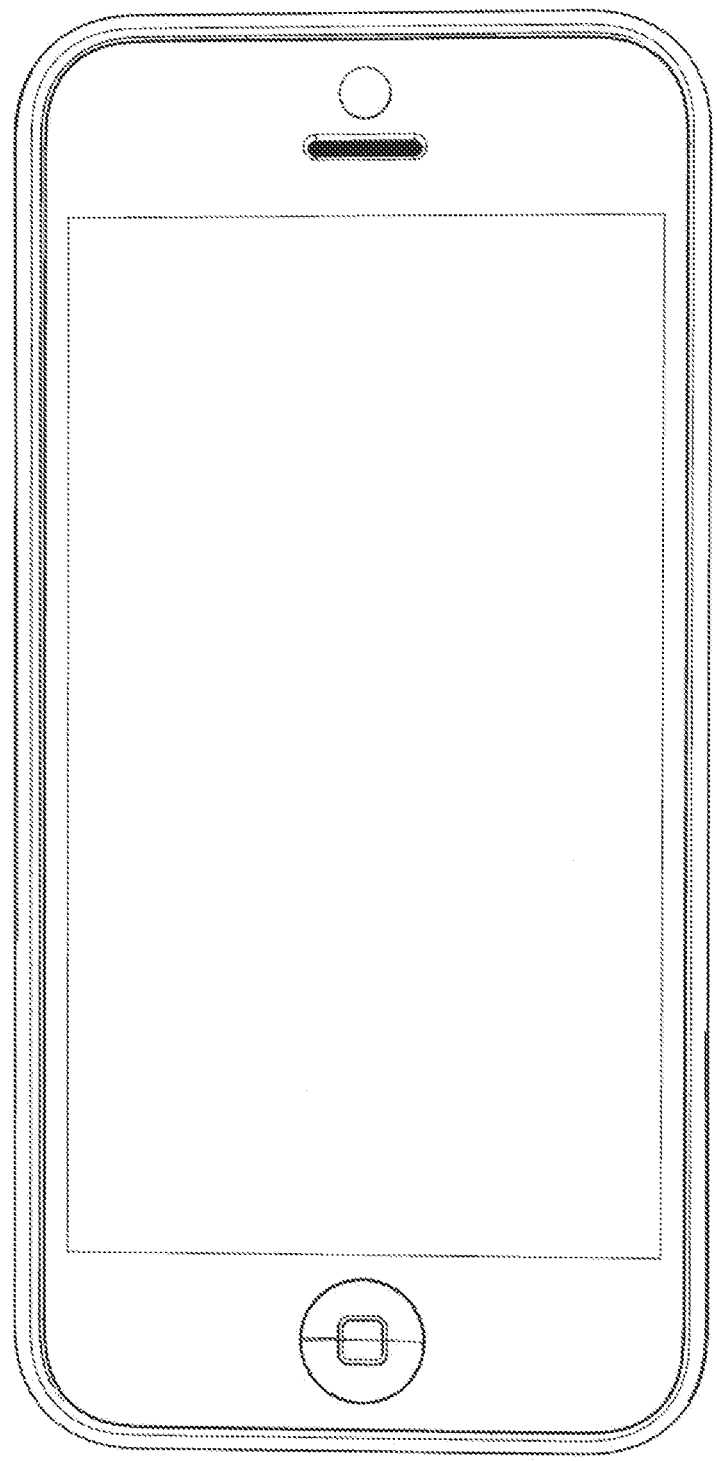
FIG. 30 depicts a view of a mobile device inserted into the assemblage of FIG. 28.

In order to accommodate the insertion and removable of memory cards 2104, removable cover 106 preferably has openings 2702 as shown in FIG. 27 which align with memory card slots 2102 when multifunction core 104 is inserted into replaceable cover 106.

The invention claimed is:

1. A multifunction core for use with a mobile device comprising:
    a plurality of peripheral devices integrated into a body of the multifunction core;
    a memory device integrated into the body of the multifunction core;
    an identification circuit for identifying if an attached external device has previously been connected to the multifunction core, wherein, if the identification circuit determines that the attached external device is unrecognized, the identification circuit identifies the operating system of the attached external device, and sends data or a link to the attached external device to allow a user to download and install an application program for controlling the memory device and the plurality of peripheral devices;
    at least one battery integrated into the body of the multifunction core; and
    at least one connection port for connecting the multifunction core to an external device via a belt connector,
    wherein the connection port supplies power or transfers data to the external device through the belt connector.

2. The multifunction core according to claim 1, wherein the plurality of peripheral devices are chosen from the group consisting of a wireless charger, an IR blaster, a speaker, and a lighting element.

3. The multifunction core according to claim 2, wherein the lighting element is a smart LED panel constructed from a PCBA board having 1 to 100 LED diodes.

4. The multifunction core according to claim 1, wherein the memory device is a memory card reader, a memory card, or a chip based memory.

5. The multifunction core according to claim 1, wherein the memory card reader comprises inputs for multiple memory cards.

6. The multifunction core according to claim 1, further comprising:
    a belt connector identification module for verifying if a belt connector attached to the multifunction core is a valid belt connector, wherein the belt connector identification module prevents transmission of data to the external device if the attached belt connector is not a valid belt connector.

7. The multifunction core according to claim 1, wherein the wireless charger recharges the battery and the attached mobile device when the wireless charger is placed within a predetermined distance of a wireless charging pad.

8. The multifunction core according to claim 1, further comprising:
    a charging port for connecting the multifunction core to an external power supply, wherein the charging support supplies power to the battery and to the mobile device.

9. A kit for protecting and providing multifunction capabilities to a mobile device, the system comprising:
    a multifunction core comprising a plurality of peripheral devices into a core body, a belt connector having a core connector, a flexible belt, and a mobile device connector; and
    at least one cover, wherein the cover further comprises:
        a core recess for allowing the multifunction core to be placed snugly therein, wherein a depth of the core recess is the same as or greater than a thickness of the multifunction core;
        a belt connector recess for accommodating the belt connector when core connector is attached to a connection port of the multifunction core, wherein the belt connector recess is located adjacent to the core recess, and wherein a depth of the belt connector recess is the same as the depth of the depth of the core recess; and
        a mobile device recess for accommodating the mobile device, wherein the mobile device recess comprises a lip around its periphery for retaining the mobile device within the cover.

10. The kit according to claim 9, wherein the mobile device recess is located above the core recess, and wherein the mobile device secures the multifunction core within the core recess when the mobile device is placed into the mobile device recess.

11. The kit according to claim 9, wherein the core recess comprises a plurality of ports which align with the peripheral devices of the multifunction core.

12. The kit according to claim 9, wherein the mobile device recess comprises a plurality of ports which align with inputs and outputs of the mobile device.

13. The kit according to claim 9, wherein the multifunction core is the same size as the mobile device, or smaller than the mobile device.

14. The kit according to claim 9, wherein the core connector is a proprietary connector and the mobile device connector is an industry standard connector.

15. The kit according to claim 9, wherein the body of the multifunction core comprises a tab extending from an edge of the body and the multifunction core; and
    the core recess comprises a tab recess greater in size than the tab, wherein a user can use a finger to remove the multifunction core from the core recess using the tab.

* * * * *